US010889340B2

(12) United States Patent
Nichol

(10) Patent No.: US 10,889,340 B2
(45) Date of Patent: Jan. 12, 2021

(54) REMOTELY CONTROLLED PACKABLE ROBOT WITH FOLDING TRACKS

(71) Applicant: Foster-Miller, Inc., Waltham, MA (US)

(72) Inventor: Jamie Gordon Nichol, Carlisle, MA (US)

(73) Assignee: Foster-Miller, Inc., Waltham, MA (US)

(*) Notice: Subject to any disclaimer, the term of this patent is extended or adjusted under 35 U.S.C. 154(b) by 384 days.

(21) Appl. No.: 16/027,561

(22) Filed: Jul. 5, 2018

(65) Prior Publication Data
US 2019/0009845 A1    Jan. 10, 2019

Related U.S. Application Data

(60) Provisional application No. 62/529,562, filed on Jul. 7, 2017.

(51) Int. Cl.
B62D 55/084    (2006.01)
B62D 55/065    (2006.01)
B62D 55/075    (2006.01)
B25J 15/02     (2006.01)
B62D 55/125    (2006.01)
(Continued)

(52) U.S. Cl.
CPC ........... B62D 55/084 (2013.01); B25J 5/007 (2013.01); B25J 15/0206 (2013.01); B62D 55/065 (2013.01); B62D 55/075 (2013.01); B62D 55/125 (2013.01); G05D 1/0011 (2013.01); G05D 2201/02 (2013.01)

(58) Field of Classification Search
CPC .. B62D 55/084; B62D 55/065; B62D 55/075; B62D 55/125; B25J 5/007; B25J 15/0206; G05D 2201/02; G05D 1/0011
See application file for complete search history.

(56) References Cited

U.S. PATENT DOCUMENTS 1,592,654 A    7/1926  Bremer
3,215,219 A    11/1965 Forsyth et al.
3,306,250 A    2/1967  Pitchford
(Continued)

FOREIGN PATENT DOCUMENTS

CN    1861333 A    11/2006
CN    2933748 Y     8/2007
(Continued)

OTHER PUBLICATIONS

Written Opinion of the International Searching Authority for PCT Application No. PCT/US2018/040975 dated Sep. 18, 2018, five (5) pages.

(Continued)

Primary Examiner — Ruth Ilan
Assistant Examiner — Marlon A Arce
(74) Attorney, Agent, or Firm — Iandiorio Teska & Coleman, LLP

(57) ABSTRACT

A compact ground robot includes a vehicle body, a forward pair of track assemblies mounted to the vehicle body, and a rearward pair of track assemblies mounted to the vehicle body. All the track assemblies are foldable underneath the vehicle body for compact transport of the robot. All the track assemblies unfold to a deployed position supporting the vehicle body for deployment of the robot. Each track assembly may include a drive sprocket, a flipper, and a tack about the sprocket and flipper.

32 Claims, 22 Drawing Sheets

(51) Int. Cl.
  *B25J 5/00* (2006.01)
  *G05D 1/00* (2006.01)

(56) References Cited

U.S. PATENT DOCUMENTS

| | | | |
|---|---|---|---|
| 3,417,832 | A | 12/1968 | Ziccardi |
| 3,869,011 | A | 3/1975 | Jensen |
| 4,337,846 | A | 7/1982 | Yonemoto et al. |
| 4,702,331 | A | 10/1987 | Hagihara et al. |
| 4,709,773 | A | 12/1987 | Clement et al. |
| 4,727,949 | A | 3/1988 | Rea et al. |
| 4,932,491 | A | 6/1990 | Collins, Jr. |
| 4,932,831 | A | 6/1990 | White et al. |
| 4,977,971 | A | 12/1990 | Crane, III et al. |
| 5,022,812 | A | 6/1991 | Coughlan et al. |
| 5,337,846 | A | 8/1994 | Ogaki et al. |
| 6,263,989 | B1 * | 7/2001 | Won .................. B25J 5/005 180/8.7 |
| 6,431,296 | B1 | 8/2002 | Won |
| 6,668,951 | B2 | 12/2003 | Won |
| 7,348,747 | B1 | 3/2008 | Theobold et al. |
| 7,475,745 | B1 | 1/2009 | DeRoos |
| 7,546,891 | B2 | 6/2009 | Won |
| 7,556,108 | B2 | 7/2009 | Won |
| 7,581,605 | B2 | 9/2009 | Caspi et al. |
| 7,597,162 | B2 | 10/2009 | Won |
| 7,926,598 | B2 | 4/2011 | Rudakevych |
| 8,074,752 | B2 | 12/2011 | Rudakevych |
| 8,100,205 | B2 | 1/2012 | Gettings et al. |
| 8,113,304 | B2 | 2/2012 | Won |
| 8,122,982 | B2 | 2/2012 | Morey et al. |
| 8,162,083 | B2 | 4/2012 | Iwaki et al. |
| 8,176,808 | B2 | 5/2012 | Fisk et al. |
| 8,201,649 | B2 | 6/2012 | Andrus et al. |
| 8,353,373 | B2 | 1/2013 | Rudakevych |
| 8,365,848 | B2 | 2/2013 | Won |
| 8,397,842 | B2 | 3/2013 | Gettings |
| 8,573,335 | B2 | 11/2013 | Rudakevych |
| 8,616,308 | B2 | 12/2013 | Morey et al. |
| 8,644,991 | B2 | 2/2014 | Ohm et al. |
| 8,763,732 | B2 | 7/2014 | Won |
| 9,014,874 | B2 | 4/2015 | Bruck et al. |
| 9,180,920 | B2 | 11/2015 | Rudakevych |
| 9,193,066 | B2 | 11/2015 | Ohm et al. |
| 9,211,648 | B2 | 12/2015 | Grinstead et al. |
| 9,216,781 | B2 | 12/2015 | Ohm et al. |
| 9,227,654 | B2 * | 1/2016 | Wolf .................. B62D 5/02 |
| 9,248,874 | B2 | 2/2016 | Won |
| 9,248,875 | B2 | 2/2016 | Wolf et al. |
| 9,457,850 | B2 * | 10/2016 | Van Mill ............ B62D 55/10 |
| 9,650,089 | B2 | 5/2017 | Ohm et al. |
| 9,656,704 | B2 | 5/2017 | Couture et al. |
| 10,119,246 | B2 | 11/2018 | Sewell et al. |
| 10,471,589 | B2 * | 11/2019 | Meeker ............... B62D 55/084 |
| 2002/0062999 | A1 | 5/2002 | De-Noor et al. |
| 2004/0155554 | A1 | 8/2004 | Morgante |
| 2004/0168837 | A1 | 9/2004 | Michaud et al. |
| 2004/0216931 | A1 | 11/2004 | Won |
| 2004/0216932 | A1 | 11/2004 | Giovanetti et al. |
| 2007/0209844 | A1 | 9/2007 | Kamimura |
| 2008/0083344 | A1 | 4/2008 | Deguire et al. |
| 2008/0093131 | A1 | 4/2008 | Couture et al. |
| 2008/0121097 | A1 | 5/2008 | Rudakevych et al. |
| 2008/0179115 | A1 | 7/2008 | Ohm et al. |
| 2008/0196946 | A1 | 8/2008 | Filippov et al. |
| 2009/0071281 | A1 | 3/2009 | Fisk et al. |
| 2009/0229894 | A1 | 9/2009 | Roucka |
| 2009/0266628 | A1 | 10/2009 | Schempf et al. |
| 2010/0068024 | A1 | 3/2010 | Agens |
| 2010/0139995 | A1 | 6/2010 | Rudakevych |
| 2010/0263524 | A1 | 10/2010 | Morin et al. |
| 2010/0263948 | A1 * | 10/2010 | Couture ............ B62D 55/065 180/8.2 |
| 2010/0267311 | A1 | 10/2010 | Zimet |
| 2011/0040427 | A1 | 2/2011 | Ben-Tzvi |
| 2011/0106339 | A1 | 5/2011 | Phillips et al. |
| 2011/0168460 | A1 | 7/2011 | Goldenberg |
| 2011/0190933 | A1 | 8/2011 | Shein et al. |
| 2012/0190491 | A1 * | 7/2012 | Gunji .................. B60K 17/046 475/5 |
| 2012/0199407 | A1 | 8/2012 | Morey et al. |
| 2012/0200149 | A1 | 8/2012 | Rudakevych et al. |
| 2012/0215358 | A1 | 8/2012 | Gettings et al. |
| 2012/0261204 | A1 | 10/2012 | Won |
| 2013/0078888 | A1 | 3/2013 | Mayer et al. |
| 2013/0152724 | A1 | 6/2013 | Mozeika et al. |
| 2013/0268118 | A1 | 10/2013 | Grinstead et al. |
| 2013/0340560 | A1 | 12/2013 | Burridge et al. |
| 2014/0031977 | A1 | 1/2014 | Goldenberg et al. |
| 2014/0065586 | A1 | 3/2014 | Gabbai |
| 2014/0110183 | A1 | 4/2014 | Rudakevych et al. |
| 2014/0166377 | A1 | 6/2014 | Terrien et al. |
| 2014/0231156 | A1 | 8/2014 | Rudakevych |
| 2014/0277718 | A1 | 9/2014 | Izhikevich et al. |
| 2016/0176452 | A1 * | 6/2016 | Gettings ............ B62D 55/0655 180/167 |
| 2018/0079070 | A1 | 3/2018 | Meeker et al. |
| 2018/0079073 | A1 | 3/2018 | Meeker et al. |
| 2018/0104815 | A1 | 4/2018 | Yang |
| 2018/0236666 | A1 | 8/2018 | Mozeika et al. |
| 2018/0313715 | A1 | 11/2018 | Cichosz et al. |
| 2019/0032433 | A1 * | 1/2019 | Sawa .................. E21B 7/124 |

FOREIGN PATENT DOCUMENTS

| | | | |
|---|---|---|---|
| EP | | 0 197 020 A1 | 3/1986 |
| WO | WO 2018/027219 A1 | | 2/2018 |

OTHER PUBLICATIONS

Lewis et al., "Chaos an Intelligent Ultra-Mobile SUGV: Combining the Mobility of Wheels, Tracks, and Legs", Proceedings of SPIE—The International Society for Optical Engineering May 2005, twelve (12) pages.

Cyberneticzoo.com, 1985-ACEC Mobile Inspection Vehicle (Belgian), http://cvberneticzoo.com/teleoperators/1985-acec-mobile-inspection-vehicle-french/, pp. 1/12-10/12, May 23, 2016.

Cyberneticzoo.com, 1976-MF3 Manipulator Vehicle-Kohler (German), http://cyberneticzoo.com/teleoperators/1976-mf3manipulator-vehicle-kohler-german/, pp. 1/19-17/19, May 23, 2016.

Mohebbi et al., "Design, Simulation and Manufacturing of a Tracked Surveillance Unmanned Ground Vehicle", Proceedings of the 2010 IEEE International Conference on Robotics and Biomimetrics, Dec. 14-18, 2010, Tianjin, China, pp. 1268-1275.

Rajabi et al., "Prediction of Obstacle Climbing Capability for Tracked Vehicles", Proceedings of the 2011 IEEE International Symposium on Safety, Security and Rescue Robotics, Kyoto, Japan, Nov. 1-5, 2011, pp. 128-133.

SuperDroid Robots, Robots, Parts, and Custom Solutions, Internet Archive WaybackMachine, May 11, 2016, https://web.archive.org/web/20081114172239/http://www.superdroidrobots.com/shop/item.asp?itemid=864, pp. 1-5.

Written Opinion of the International Searching Authority for PCT Application No. PCT/US17/51986 dated Jan. 18, 2018, six (6) pages.

Written Opinion of the International Searching Authority for PCT Application No. PCT/US17/52157 dated Nov. 27, 2017, four (4) pages.

Written Opinion of the International Searching Authority for PCT Application No. PCT/US2017/045736 dated Oct. 31, 2017, nine (9) pages.

PCT International Search Report for PCT Application No. PCT/US2017/045736 dated Oct. 31, 2017, (three (3) pages).

* cited by examiner

REMOTELY CONTROLLED PACKABLE ROBOT WITH FOLDING TRACKS

RELATED APPLICATIONS

This application claims benefit of and priority to U.S. Provisional Application Ser. No. 62/529,562 filed Jul. 7, 2017, under 35 U.S.C. §§ 119, 120, 363, 365, and 37 C.F.R. § 1.55 and § 1.78, which is incorporated herein by this reference.

FIELD OF THE INVENTION

This invention relates to mobile, radio controlled, ground robots.

BACKGROUND OF THE INVENTION

Several existing ground robots are fairly maneuverable but are fairly heavy and too large to fit in a soldier's backpack. See, for example, U.S. Pat. Nos. 8,201,649; 5,022,812 and 7,597,162 all incorporated herein by this reference. Other robots are smaller in weight and can be placed in a backpack but are not maneuverable enough, for example, to climb stairs. See also U.S. Pat. No. 9,180,920 and published U.S. Patent Application No. 2009/0266628 both incorporated herein by this reference.

SUMMARY OF THE INVENTION

Featured is a light weight, compact, man-packable robot which, in some examples, is highly mobile and includes stair climbing abilities. The ground robot is particularly useful for clearing buildings, caves, and other restricted terrain where close quarters combat is likely.

Featured is a compact ground robot comprising a vehicle body, a forward pair of track assemblies mounted to the vehicle body, and a rearward pair of track assemblies mounted to the vehicle body. The forward and rearward pair of track assemblies are foldable underneath the vehicle body for transport of the robot. The forward and rearward pair of track assemblies are also unfoldable to a deployed position supporting the vehicle body for deployment of the robot.

In some cases, each track assembly includes a drive sprocket, a flipper, and a track about the sprocket and flipper. The flipper may terminate in a pulley. The flipper may be motorized for rotation. In some examples, each track assembly sprocket and flipper rotate about a shaft connected to the vehicle body. Then, each track assembly may be connected to an arm. There is a bracket mounted to the vehicle body for each track assembly, and the arm is locked to the bracket for deployment and unlocked from the bracket for transport of the robot. The arm may include one or more pins and the bracket includes one or more slots receiving said pins therein. In one version, the forward track assembly arm includes a first pin receivable in a first slot in the bracket and a second pin in a second slot in the bracket. The rearward track assembly arm may include a portion with first and second pins. Then, the bracket for the rearward track assembly arm includes a first slot for the first pin and second slot for the second pin oriented 90° with respect to the first slot. Preferably, the brackets are made of high-durometer elastomeric material.

In one preferred embodiment, each track assembly includes a first motor coupled to the shaft for rotating the sprocket and a second motor coupled to the shaft for rotating the flipper. There may be one or more gears between the sprocket and the first motor and one or more gears between the flipper and the second motor. In one example, the drive sprocket includes a housing rotatable with respect to the shaft and enclosing the first and second motors therein. The flipper may be coupled to a flipper drive gear in the sprocket housing rotatable about the shaft and rotatable with respect to the housing.

The robot may further include a robot arm mounted to the vehicle body. There may be an end effector for the robot arm. In one example, the end effector includes compliant first and second pivoting jaws and a driven tendon connected to the jaws. A linear actuator may be included to drive the tendon to open and close the jaws.

Also featured is a compact ground robot comprising a vehicle body including a forward pair of brackets and a rearward pair of brackets, a forward pair of track assemblies each including an arm lockable with respect to a forward bracket to deploy the forward pair of track assemblies and the arm rotatable with respect to a forward bracket to fold the forward track assemblies underneath the vehicle body, and a rearward pair of track assemblies each including an arm lockable with respect to a rearward bracket to deploy the rearward pair of track assemblies and each arm rotatable with respect to a rearward bracket to fold the rearward track assemblies underneath the vehicle body.

In one example, a compact ground robot includes a vehicle body including a forward pair of brackets and a rearward pair of brackets. A forward pair of track assemblies each include a track driven by a sprocket rotatable about a shaft coupled to a front arm lockable into a forward bracket to deploy the forward pair of track assemblies. The arm is rotatable with respect to a forward bracket to fold the forward track assemblies underneath the vehicle body. The rearward pair of track assemblies each include a track driven by a sprocket rotatable about a shaft coupled to a rear arm lockable with respect to a rearward bracket to deploy the rearward pair of track assemblies. The arm is rotatable with respect to a rearward bracket to fold the rearward track assemblies underneath the vehicle.

In some embodiments, each track assembly further includes a flipper. The forward track assembly front arm may include a first pin receivable in a first slot in the bracket and a second pin rotatable 90° in a second slot in the bracket. The rearward track assembly rear arm may include a portion with first and second pins. The rearward track assembly rear arm may include a first slot for the first pin and second slot for the second pin oriented 90° with respect to the first slot.

In some examples, a compact ground robot comprises a vehicle body, a forward pair of track assemblies mounted to the vehicle body and a rearward pair of track assemblies mounted to the vehicle body. Each track assembly may include a drive sprocket, a flipper, and a track about the sprocket and flipper.

The drive sprocket and flipper are preferably rotatable about a shaft connected to the vehicle body. A first motor may be coupled to the shaft for rotating the drive sprocket and a second motor may be coupled to the shaft for rotating the flipper. The drive sprocket preferably houses the first and second motors therein.

The track assemblies may further include one or more gears between the sprocket and the first motor and one or more gears between the flipper and the second motor. The flipper may be coupled to a flipper drive gear in the drive sprocket and rotatable about the shaft and rotatable with respect to the drive sprocket. The vehicle body may include brackets for the track assemblies and the track assemblies each include an arm coupled to the track assembly shaft. The arms and the brackets are configured to deploy the track assemblies and to fold them underneath the vehicle body.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features, and advantages will occur to those skilled in the art from the following description of a preferred embodiment and the accompanying drawings, in which.

DETAILED DESCRIPTION OF THE INVENTION

Figure 1:
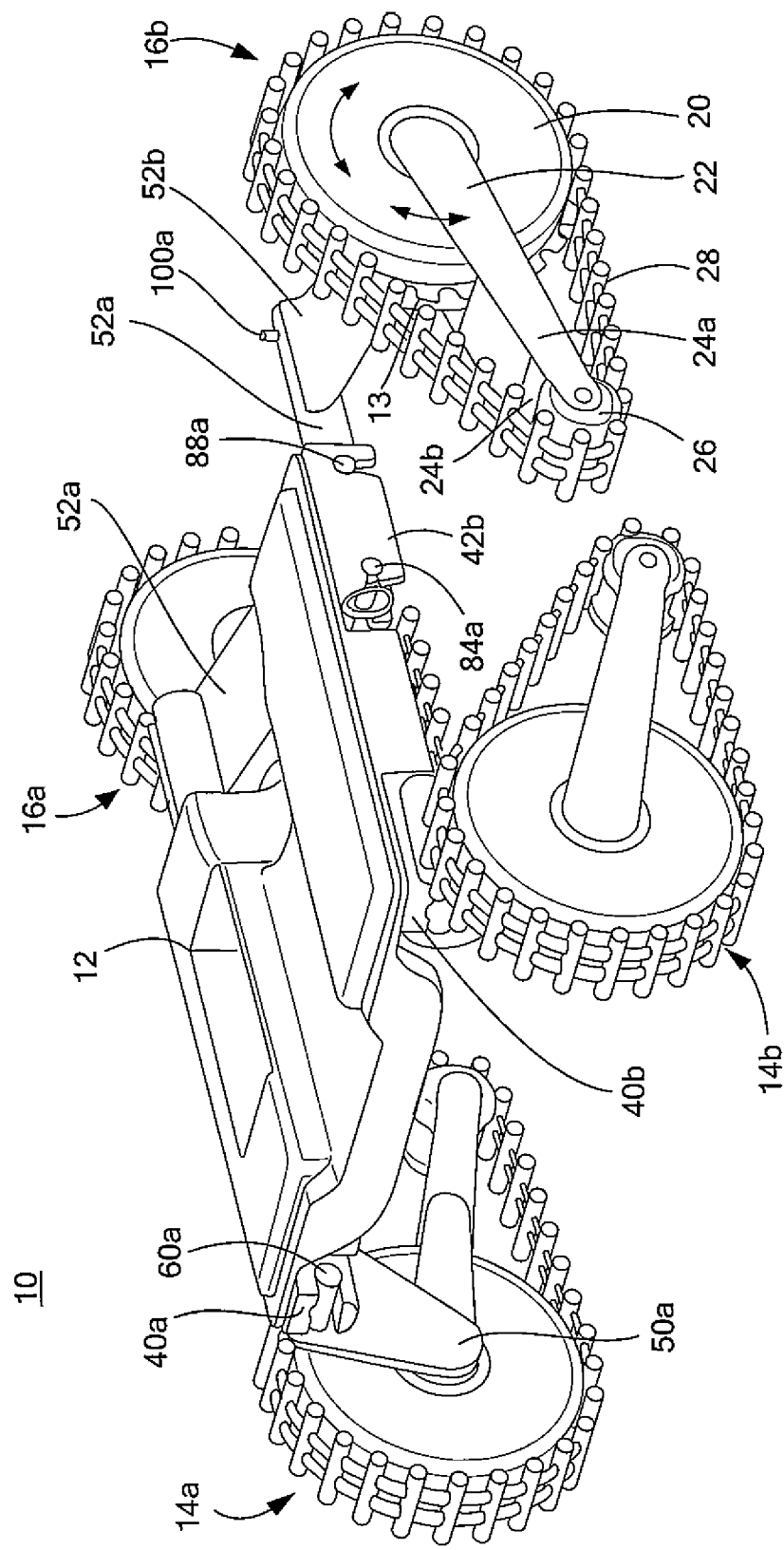
FIG. 1 a schematic view of an example of a ground robot in accordance with the invention shown in the deployed configuration.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
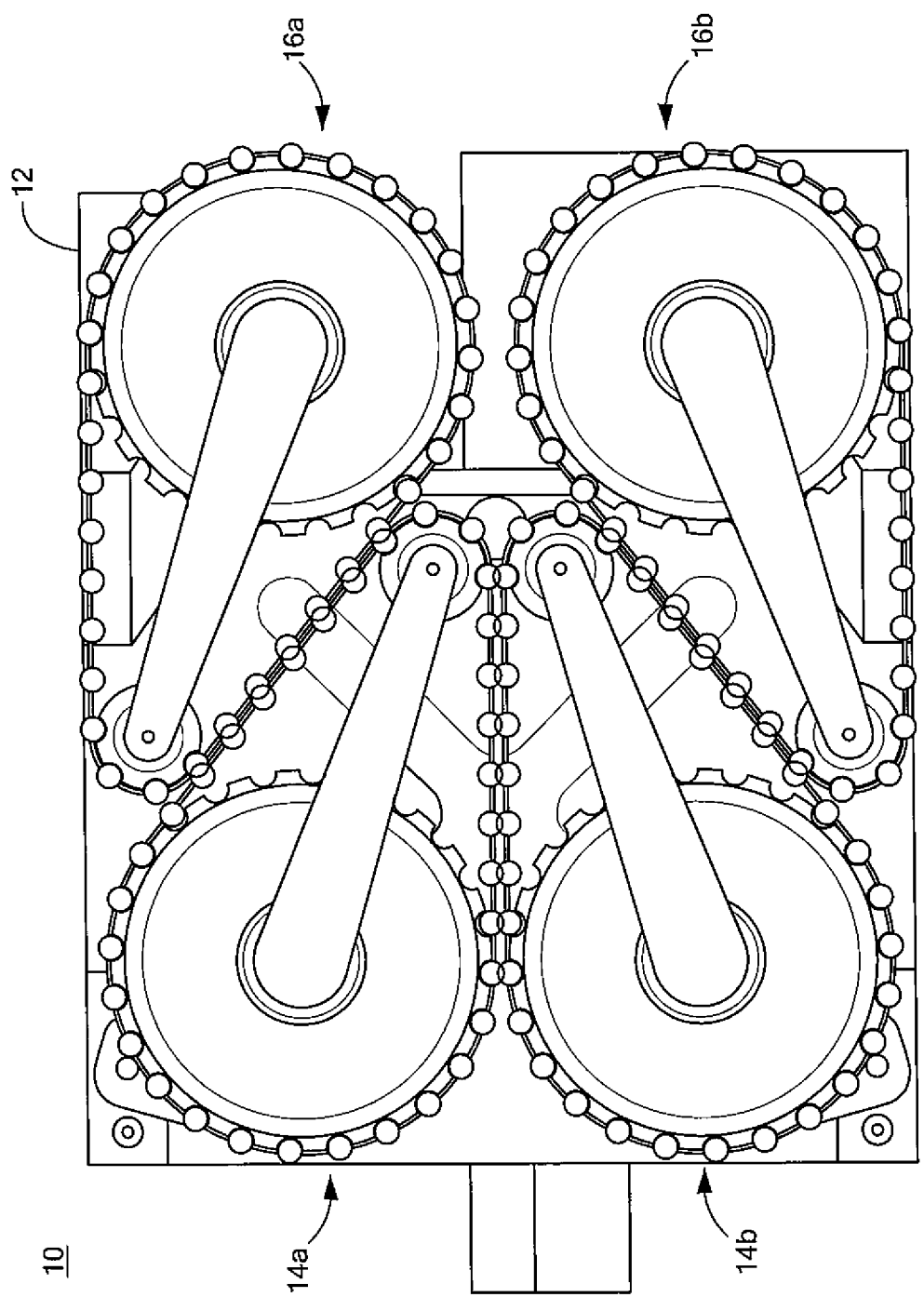
FIG. 2 is a schematic view showing the bottom of the robot of FIG. 1 in the stowed, packable configuration.
Figure 3:
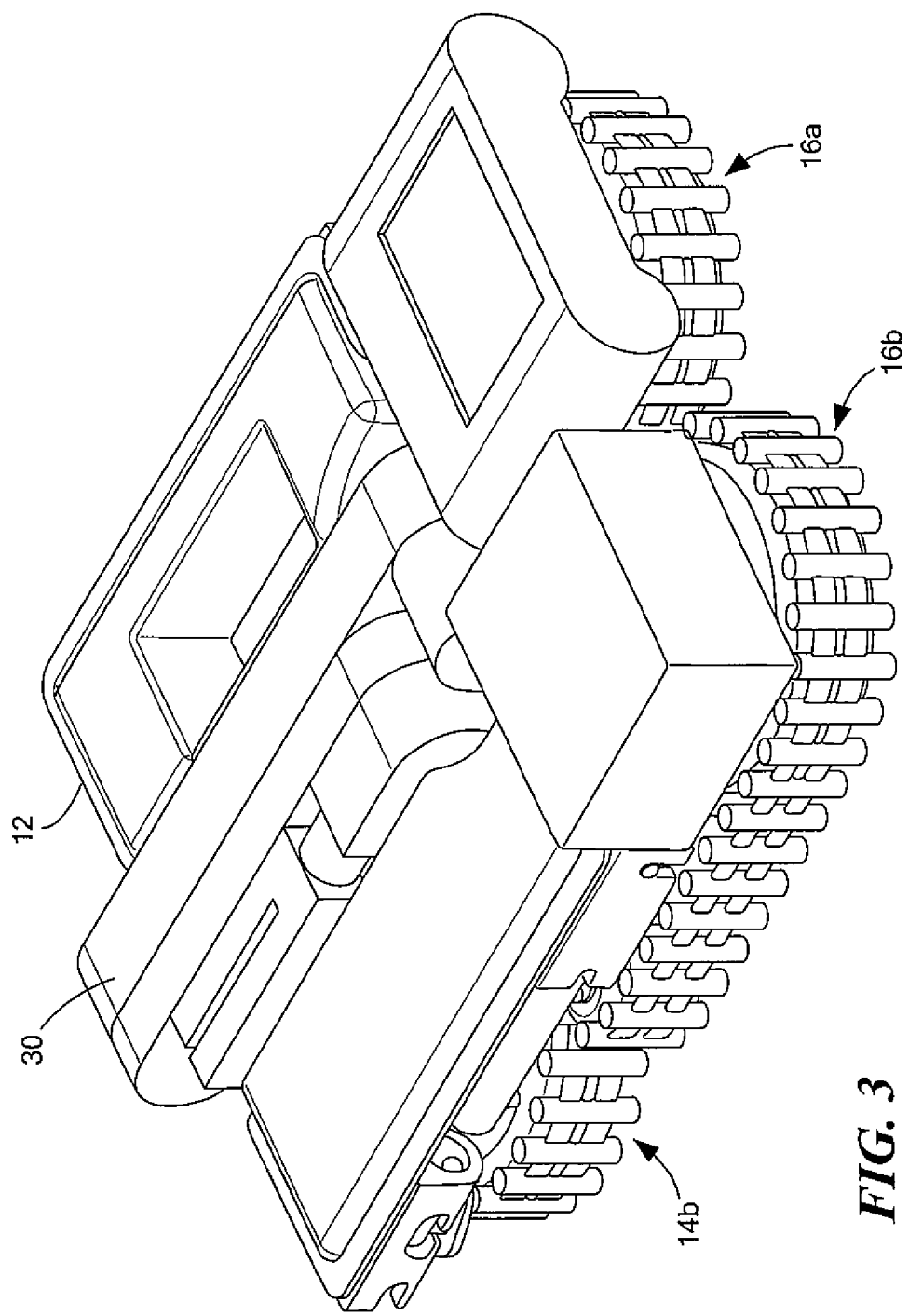
FIG. 3 is a schematic top view showing the robot of FIGS. 1 and 2 in the stowed configuration.

In one example, robot 10, FIG. 1 includes vehicle body 12, forward track assemblies 14a and 14b, and rearward track assemblies 16a and 16b. In FIG. 1, all the track assemblies are shown in their deployed position. As shown in FIGS. 2-3, each track assembly is foldable underneath the vehicle body for compact transport of the robot. FIG. 3 also show robot arm 30 in its stowed position for transport of the robot. Various foldable cameras, sensors, and the like may also be included.

Figure 4:
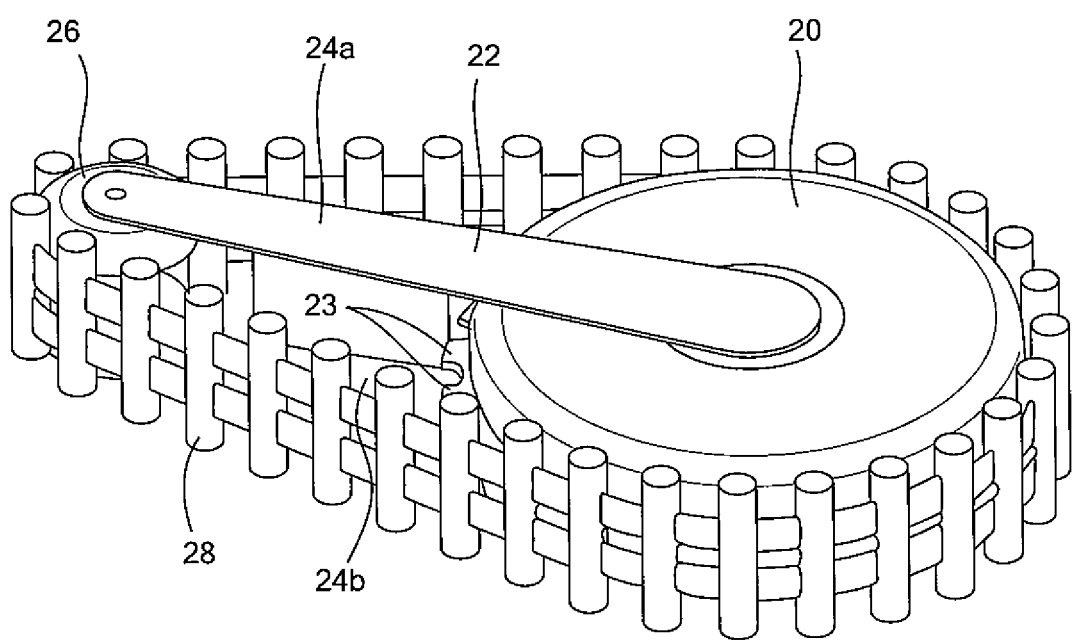
FIG. 4 is a schematic view of a preferred example of a track module for the robot of FIG. 1.

Preferably, each track assembly includes a puck shaped drive sprocket hub 20, FIG. 4 with teeth 23, and a driven flipper 22 which may include spaced side members 24a and 24b, one on each side of hub 20. The terminal ends of side members 24a, 24b may rotatably support passive roller or pulley 26. Track 28 is disposed about hub 20 and pulley 26 and the track is driven by hub sprocket teeth 23. Motors for the drive sprocket 20 and flipper 22 are preferably housed in puck shaped hub sprocket 20. Various gears, motor drivers, and encoders, and the like may also be housed in puck shaped sprocket 20. Thus, preferably all the track assemblies are configured the same and all are interchangeable and easily replaced.

In one design, front brackets 40a, 40b, FIG. 1 are attached to vehicle body or chassis 12 and rear brackets (see bracket 42b) are also attached to the vehicle body. Each sprocket hub 20 and flipper 22 rotate about an axle shaft (discussed below) which is connected to an arm. Forward arm 50a is shown in FIG. 1 and the rear arms 52a and 52b are also shown in FIG. 1.

For deployment, the arms are locked into their respective brackets. For stowage, the arms are unlocked from their respective brackets as shown in FIG. 2. In this specific design shown, one or more pins associated with the arms cooperate with one or more slots in the brackets to lock and unlock the arms from their respective brackets.

Figure 5A:
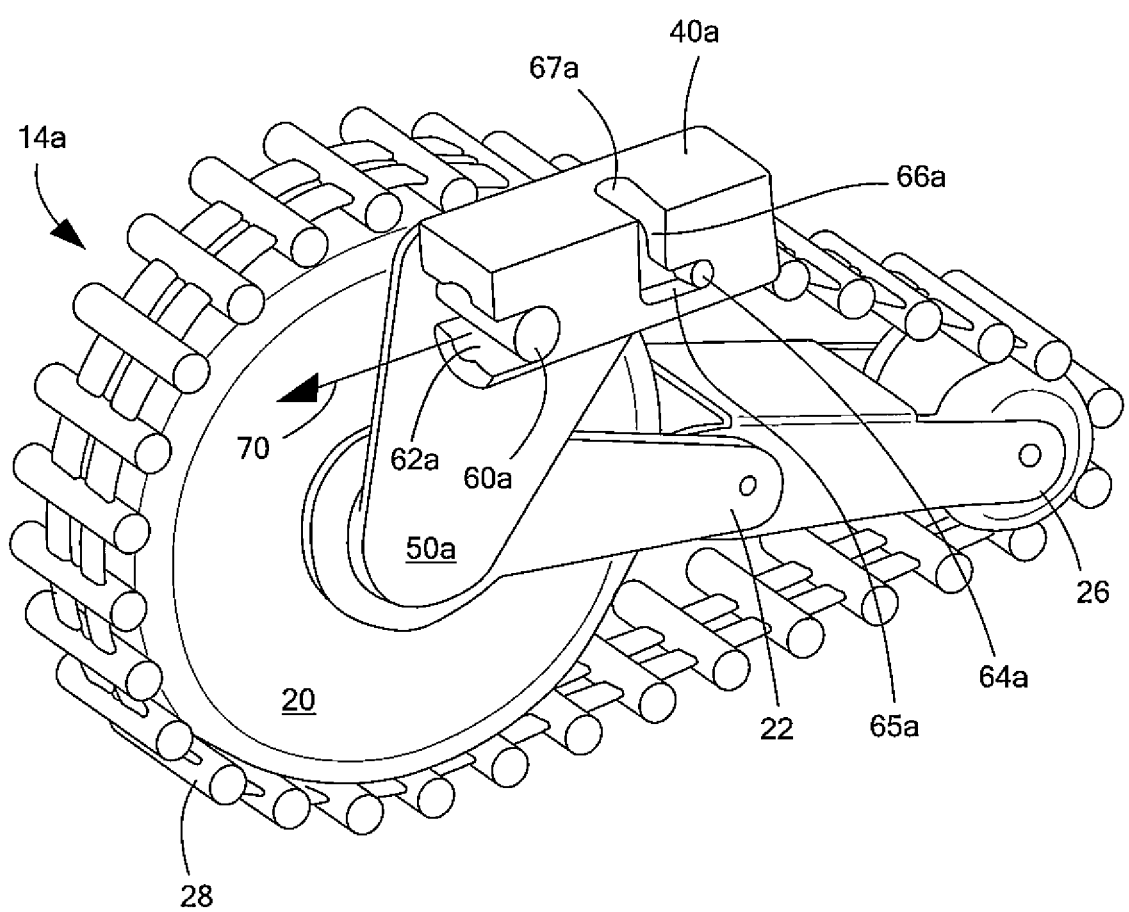
FIG. 5A shows an example of a front folding mechanism with the track module in its deployed configuration.

As shown in FIG. 5A for the front tracks, arm 50a pin 60a is received in forward slot 62a in bracket 40a and rear pin 64a is received in side portion 65a of bracket slot 66a for the deployed configuration.

Figure 5B:
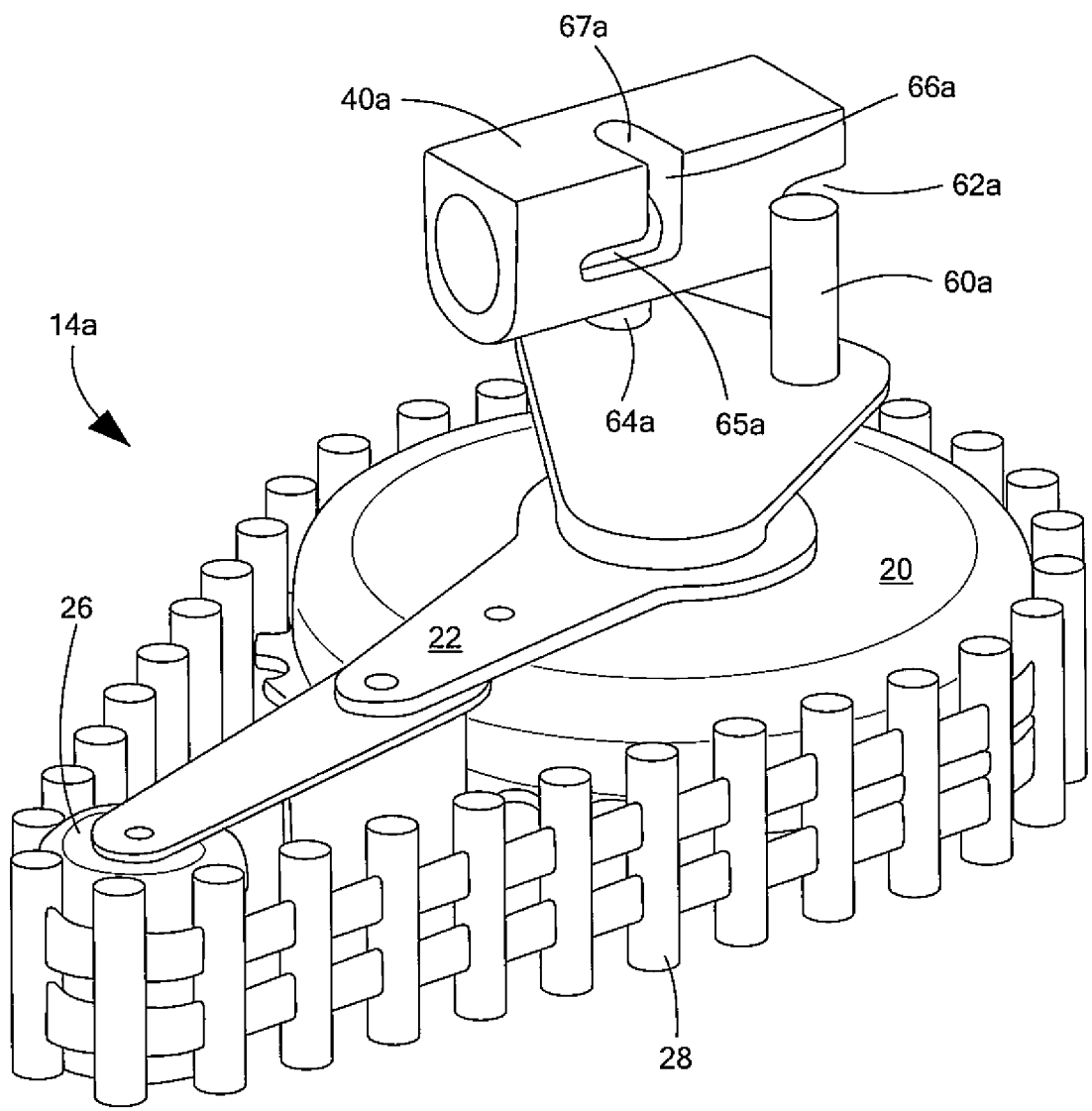
FIG. 5B shows the front folding mechanism of FIG. 5A with the track module now in its stowed configuration.

To fold the forward track assemblies as shown in FIG. 5A, pin 60a is driven in the direction shown by arrow 70 out of slot 62a and pin 64a is also driven out of the side portion 65a of slot 66a. The arm is then rotated 90° and consequently pin 64a is driven into the top portion 67a of bracket slot 66a. The folded forward track assembly is shown in FIG. 5B.

Figure 6A:
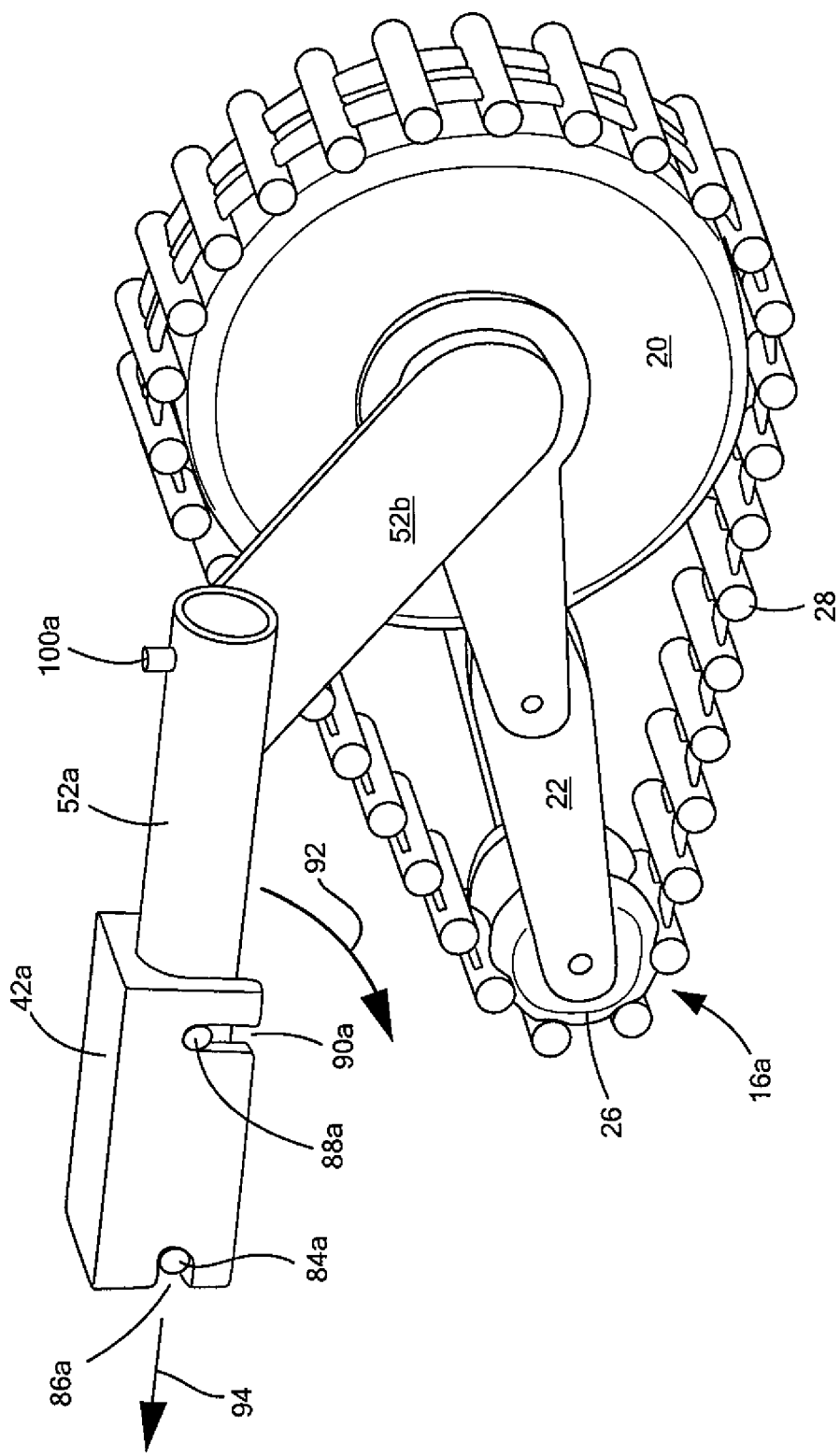
FIG. 6A is a schematic view showing an example of a rear folding mechanism with the track module in the deployed configuration.

For the rear track assemblies, the arm 52b is coupled to a shaft about which sprocket hub 20 and flipper arm 22 rotate. The arm 52b, shown in FIG. 6A, preferably includes tube portion 52a coupled to member 52b. Tube portion 52a includes pin 84a received in forward slot 86a of bracket 42a and pin 88a is received in bracket slot 90a oriented 90° with respect to slot 86a.

Figure 6B:
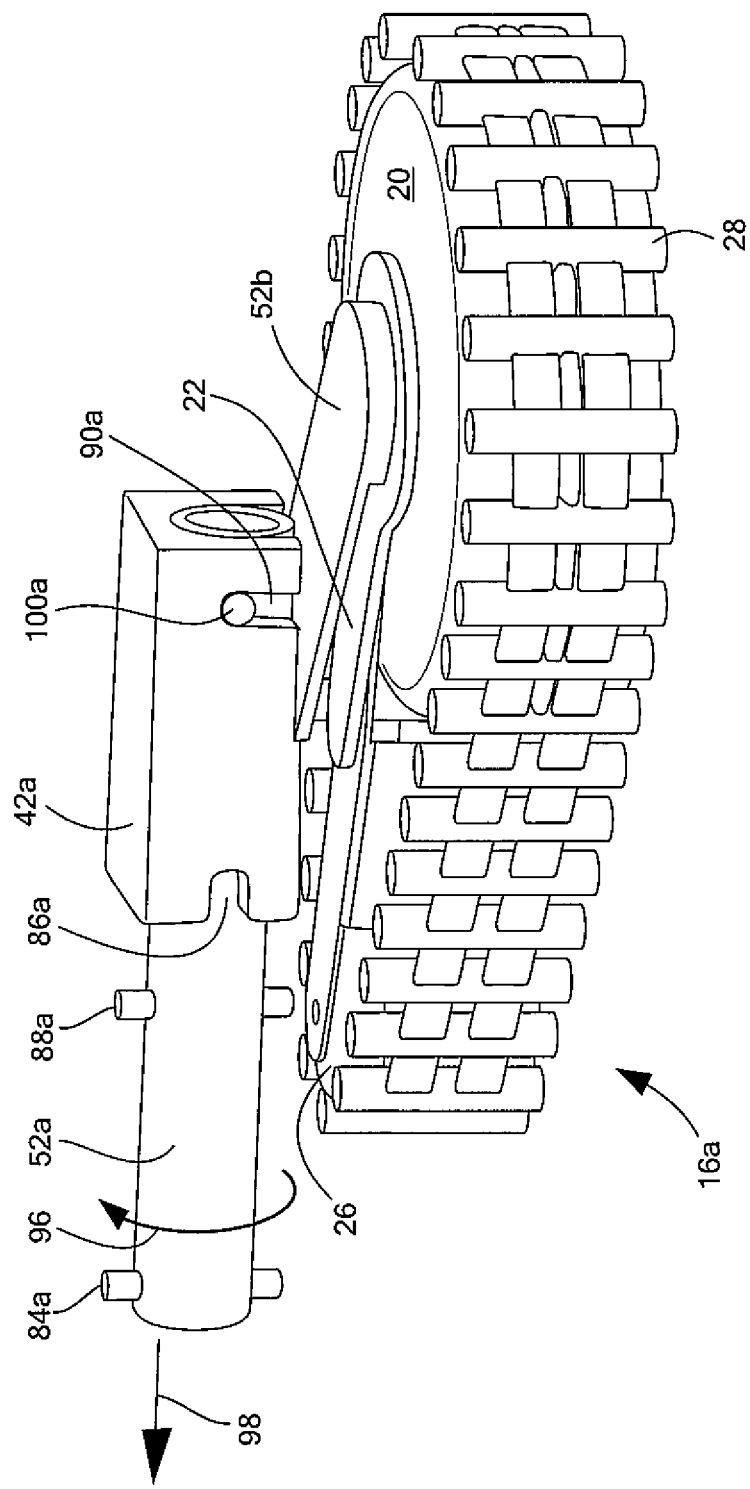
FIG. 6B is a schematic view showing the rear folding mechanism of FIG. 6A with the track module now in its stowed configuration.
Figure 7A:
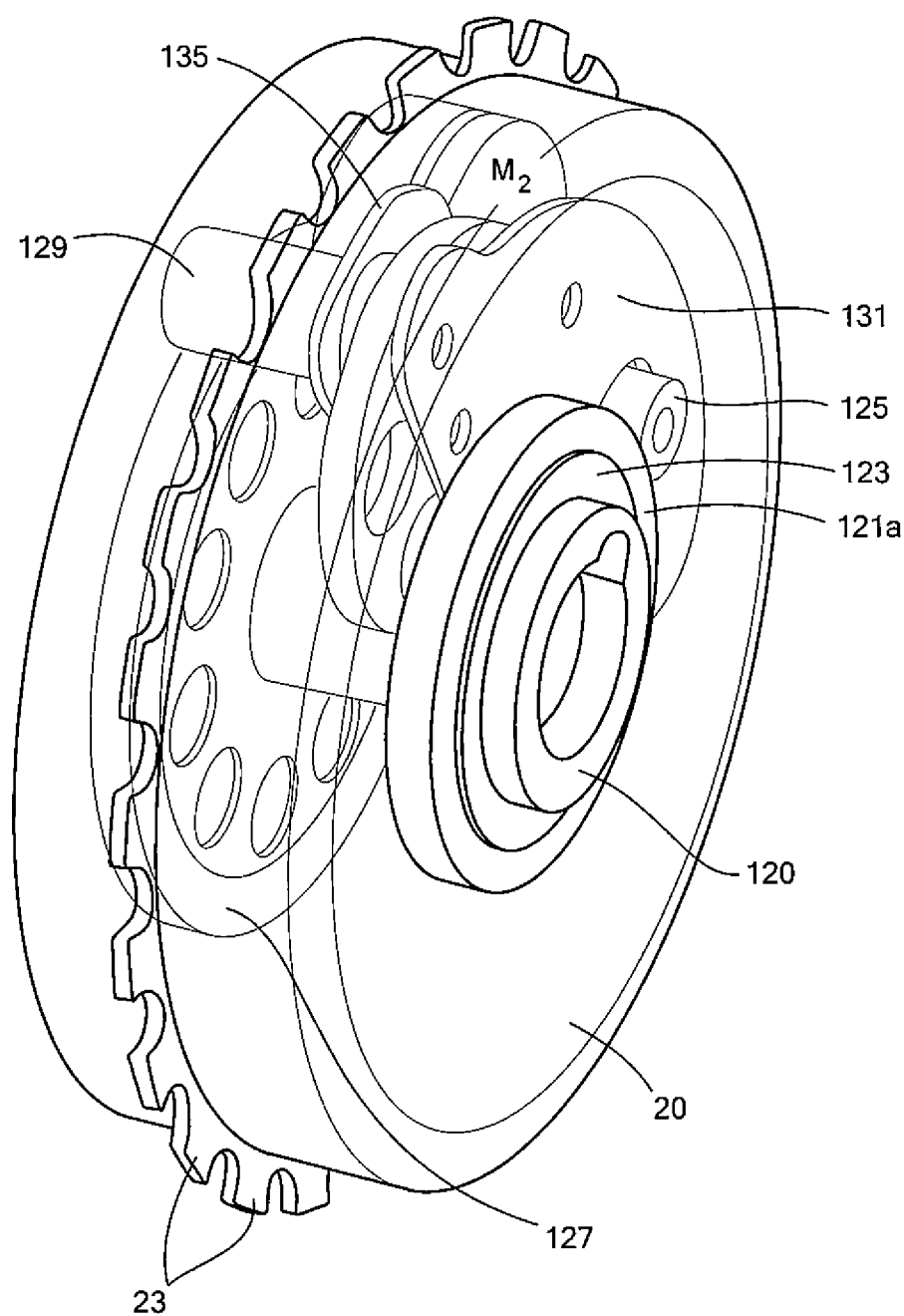
FIGS. 7A-7D are schematic views of a version of the track module sprocket hub components.
Figure 7B:
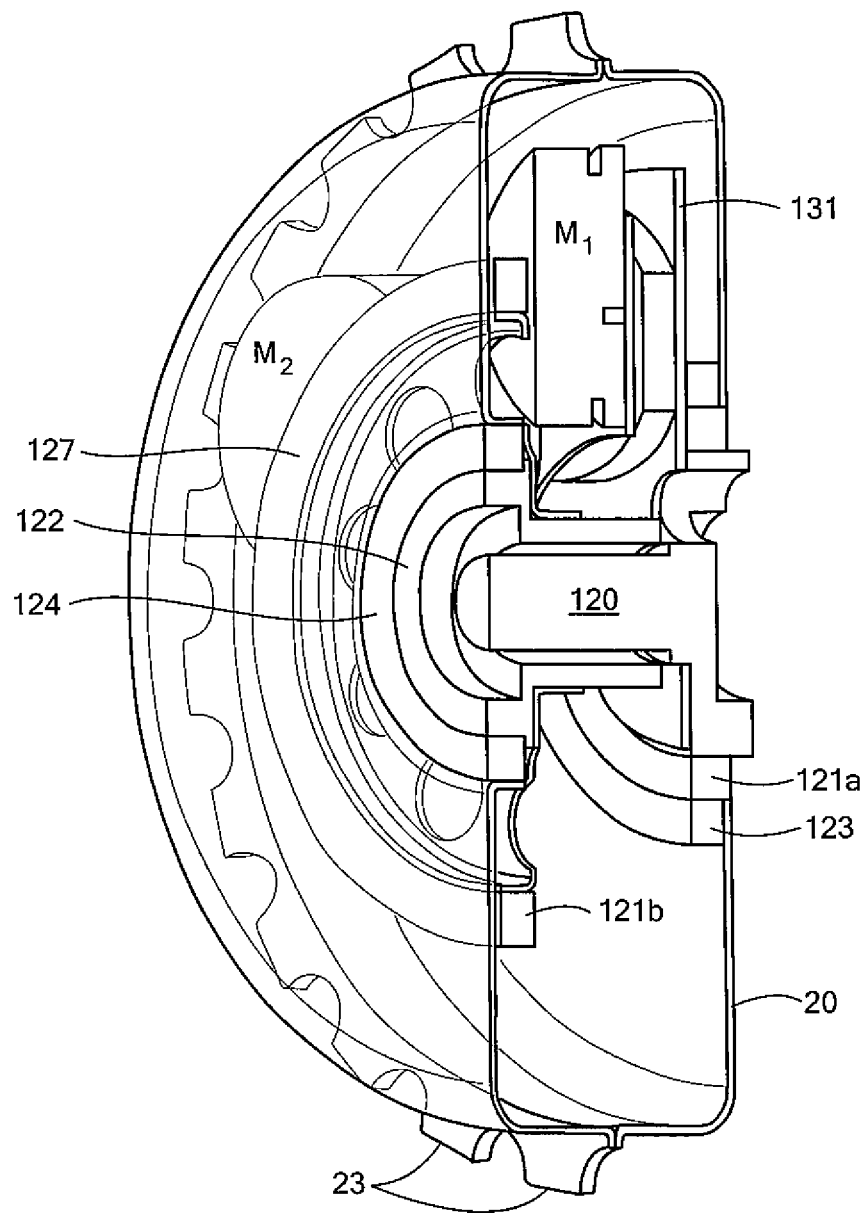
Figure 7C:
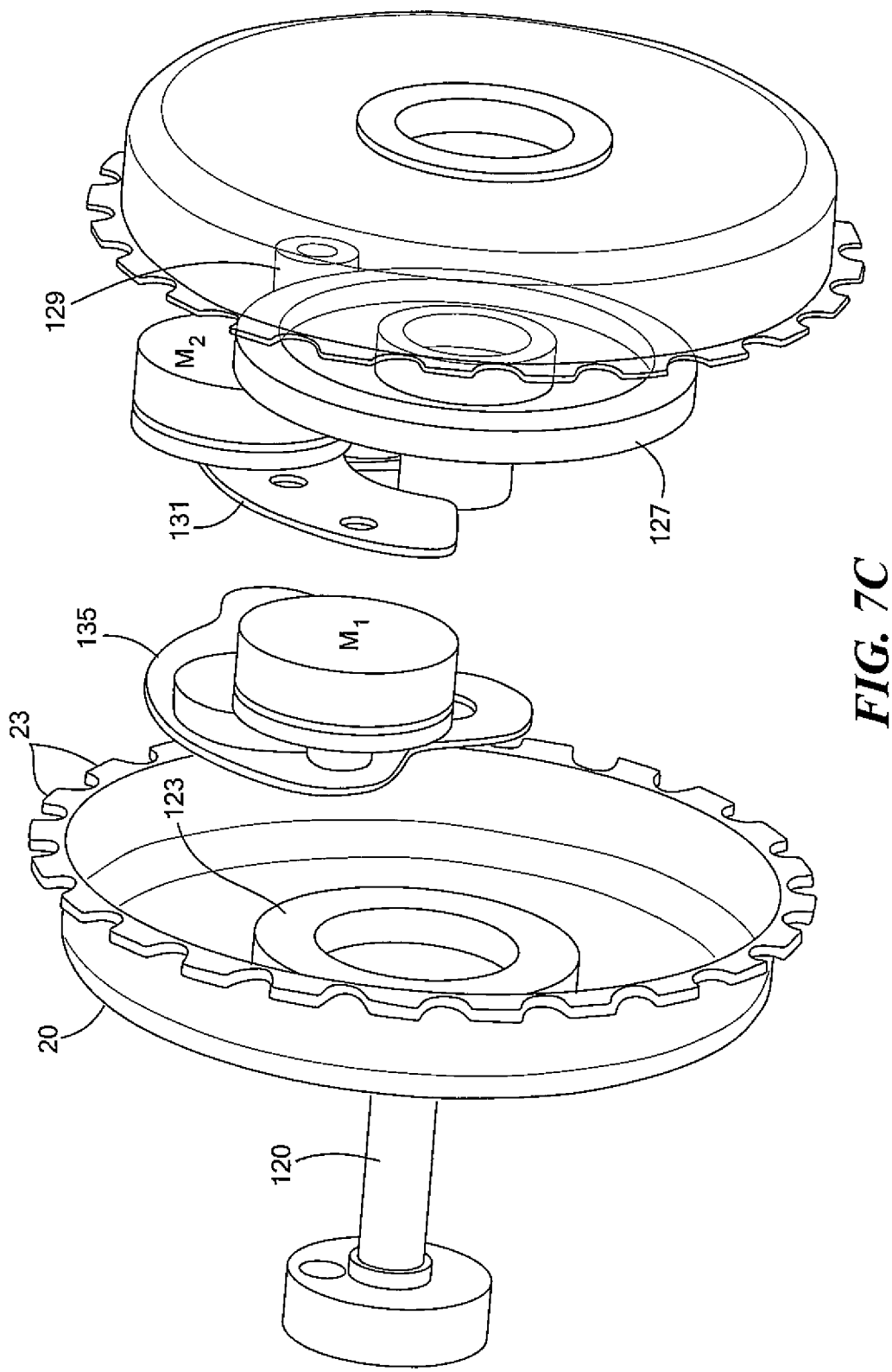
Figure 7D:
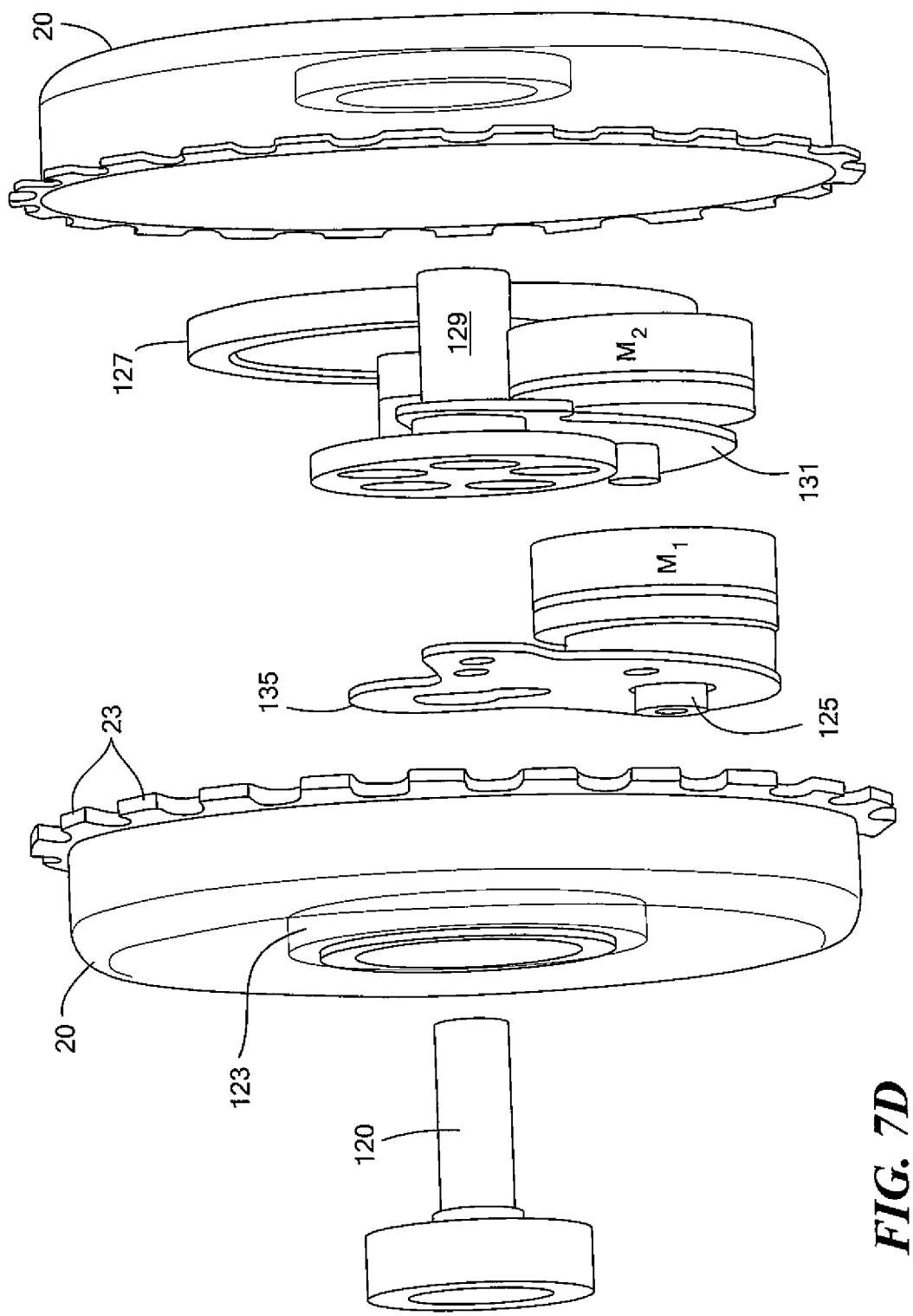

For storage, pin 88a is driven out of slot 90a by moving tube 88 downward as shown by arrow 92. Then, pin 84a is driven out of slot 86a in the direction of arrow 94. By sliding tube 52a as shown by arrow 98 in FIG. 6B and rotating it in the direction shown by arrow 96, pin 100a of tube 52a can now be engaged in slot 90a.

Preferably, the track modules are light weight (each weighing, for example, 1 Kg) and each are equipped with a cable extending to the vehicle body electronics section. Power is thus supplied from the battery or batteries housed in the vehicle body to the motor or motors in the sprocket hub via the cable. The cable may also transmit signals to and from the sprocket hub to the electronics section of the robot. Maneuvering the robot tends to seat the respective arm pins in their respective bracket slots. The brackets are preferably made of a high durometer elastomeric material to absorb impacts. Preferably the weight of a complete system is less than 20 pounds. A complete system would include an operator control unit (see e.g., U.S. Pat. No. 9,014,874 incorporated herein by this reference). In the stowed or folded configuration shown in FIGS. 2-3, 5B and 6B, the robot fits in a tactical or assault backpack (MOLLE or others) which is approximately 16" high, 13" wide and 4" in diameter. In one example, the MOLLE Assault Pack II NSN number is 8465-01-580-0981. The robot can climb and descend 8 inch by 10 inch stairs. Various maneuvers or modalities for the robot are shown in U.S. Pat. No. 7,581,605 incorporated herein by this reference.

FIGS. 7A-7D show an example of a hub assembly 20. Axle shaft 120 is stationary with respect to the robot body and does not rotate. Shaft 120 is coupled to the arm portion 50a, FIG. 5A or 52a, FIG. 6A of the folding mechanisms. Shaft 120 may be coupled to the robot chassis in other ways. Hub 20 rotates about shaft 120 via bearings 121a and 121b and hub gear 123 is driven by motor $M_1$ driving gear 125. In this way, hub teeth 23 drives a track. Flipper drive gear 127 also rotates about shaft 120 inside hub 20 and is driven by gear 129 which is driven by motor $M_2$. In this way, flipper drive gear 127 drives a flipper whose side members (24a and 24b, FIG. 1) are attached to the flipper drive gear 127, FIG. 7D. The motors and gears and/or gear trains driving flipper drive gear 127 and hub drive gear 123 may be located on plates inside hub 20 and fixed to shaft 120. See plates 131 and 135.

Figure 8:
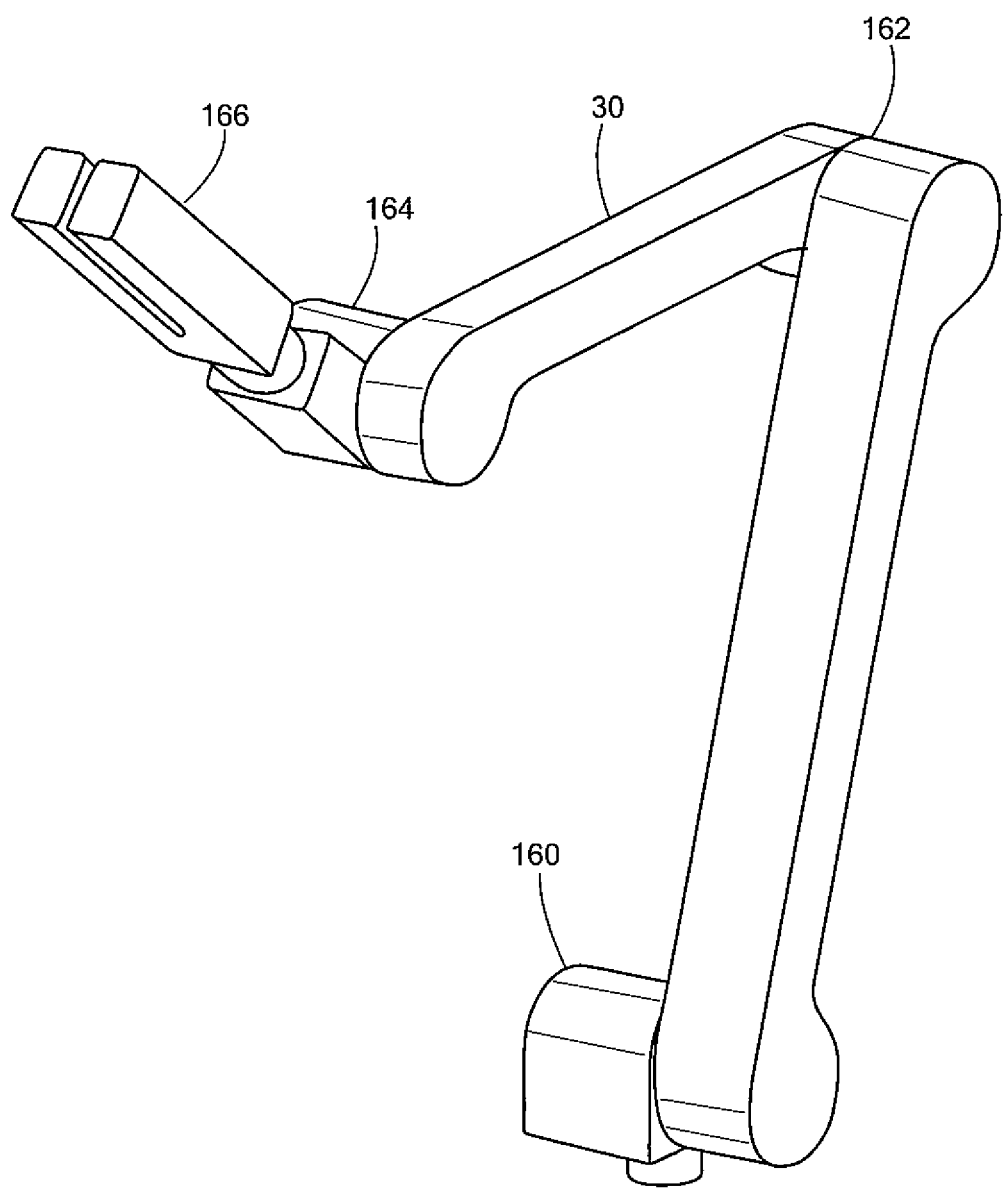
FIG. 8 is a schematic view showing one example of a robot arm for the ground robot.
Figure 9:
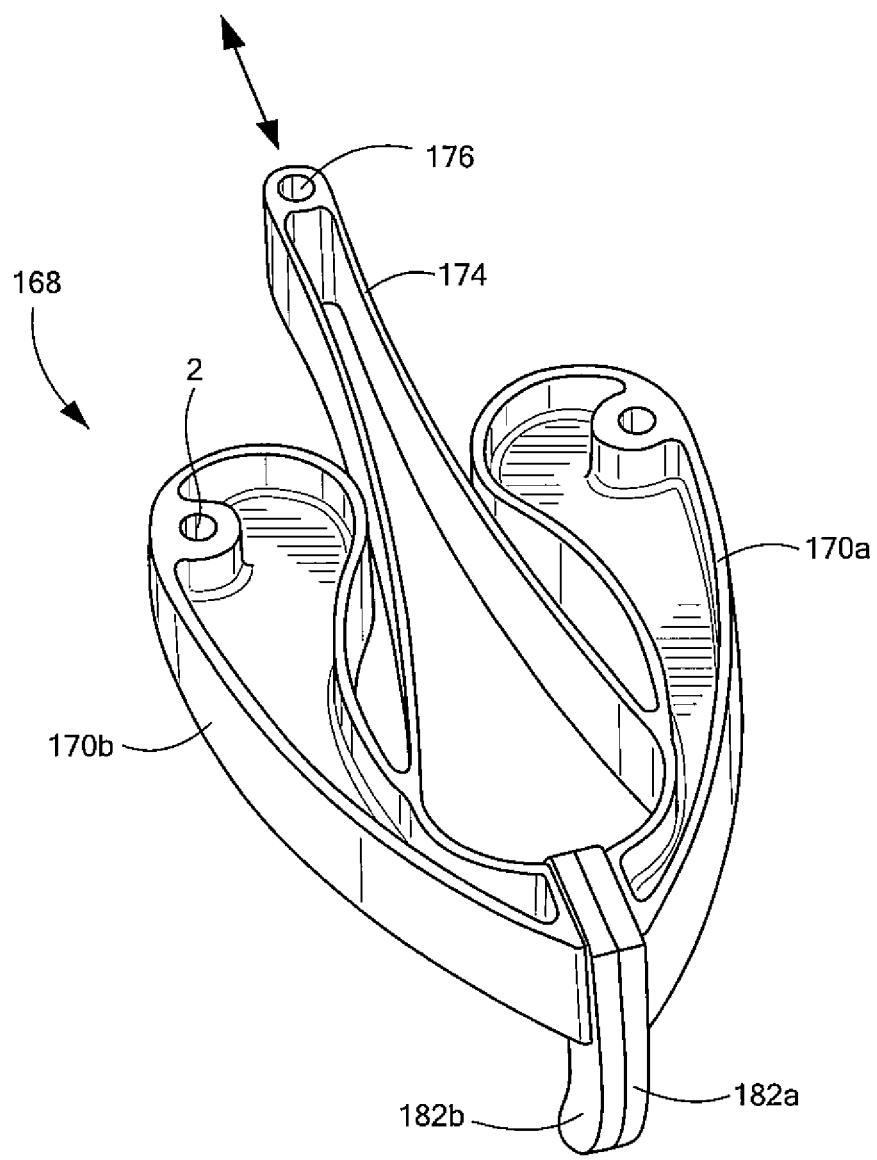
FIGS. 9-10 are schematic views showing an example of an end effector for the robot arm of FIG. 8.
Figure 10:
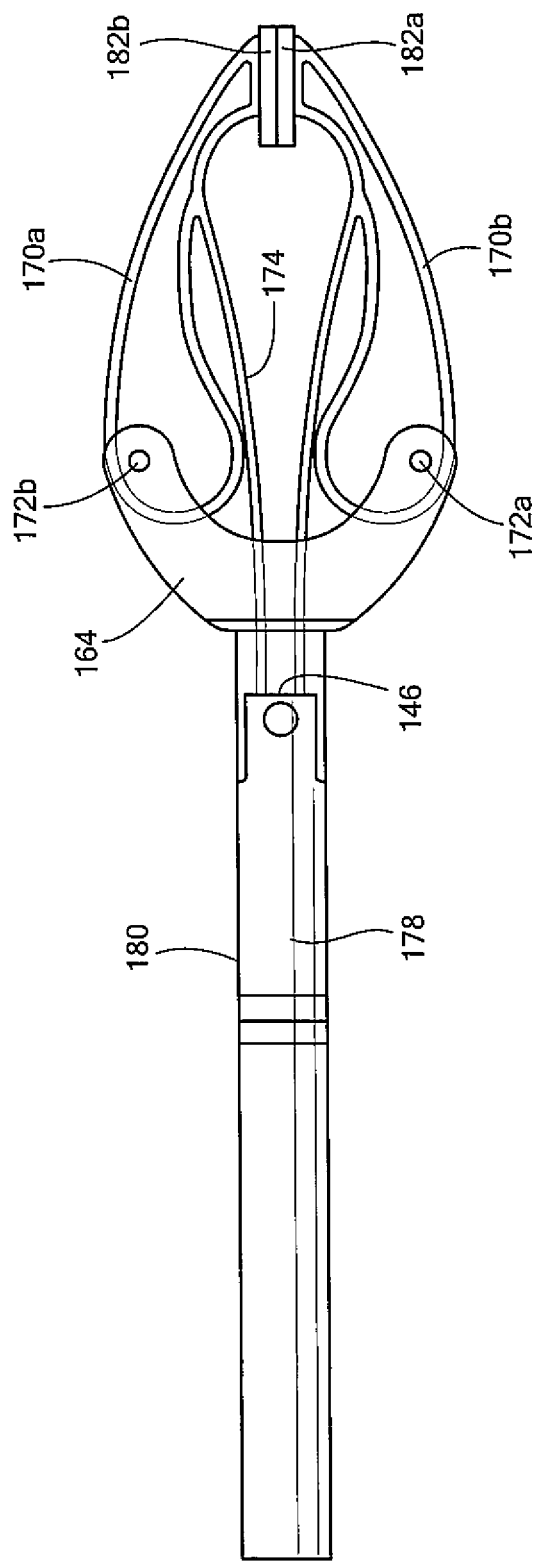
Figure 11A:
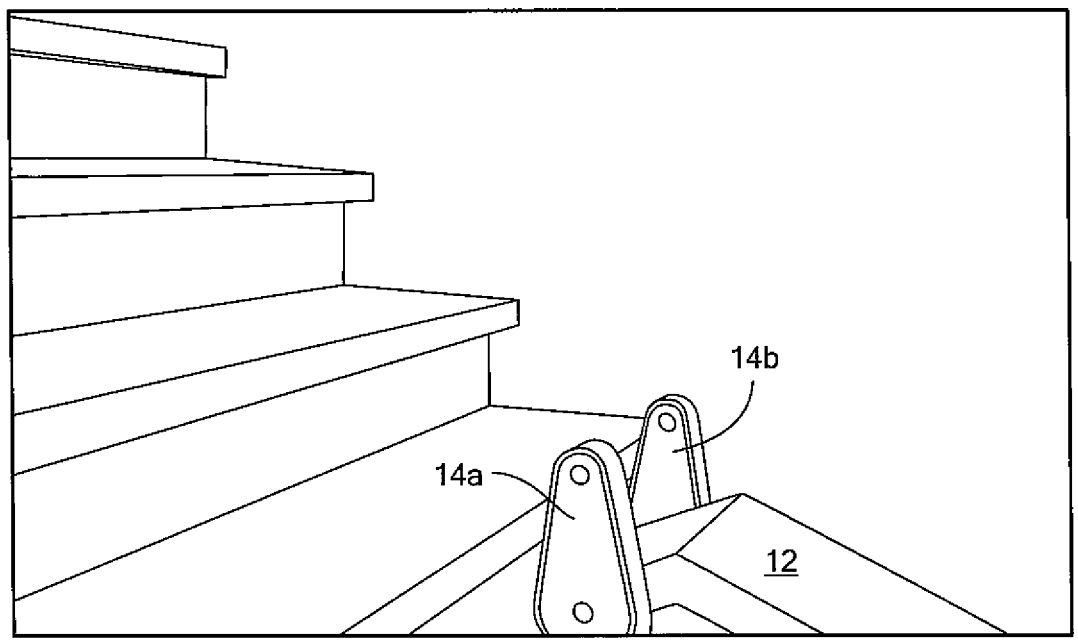
FIGS. 11A-11J are schematic views showing one configuration of the deployed robot for stair climbing behaviors.
Figure 11B:
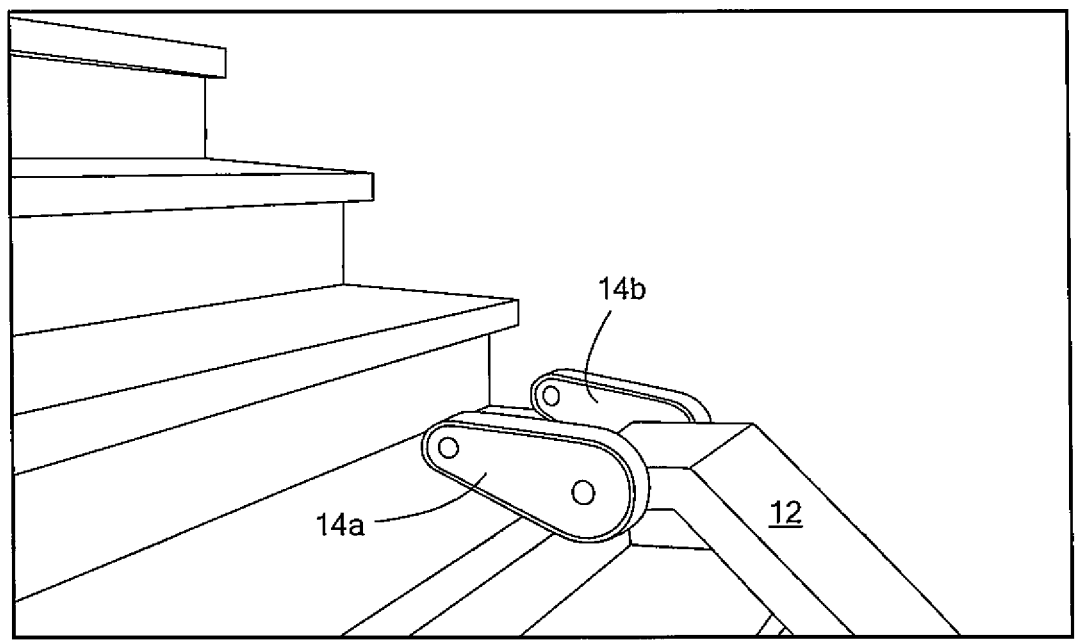
Figure 11C:
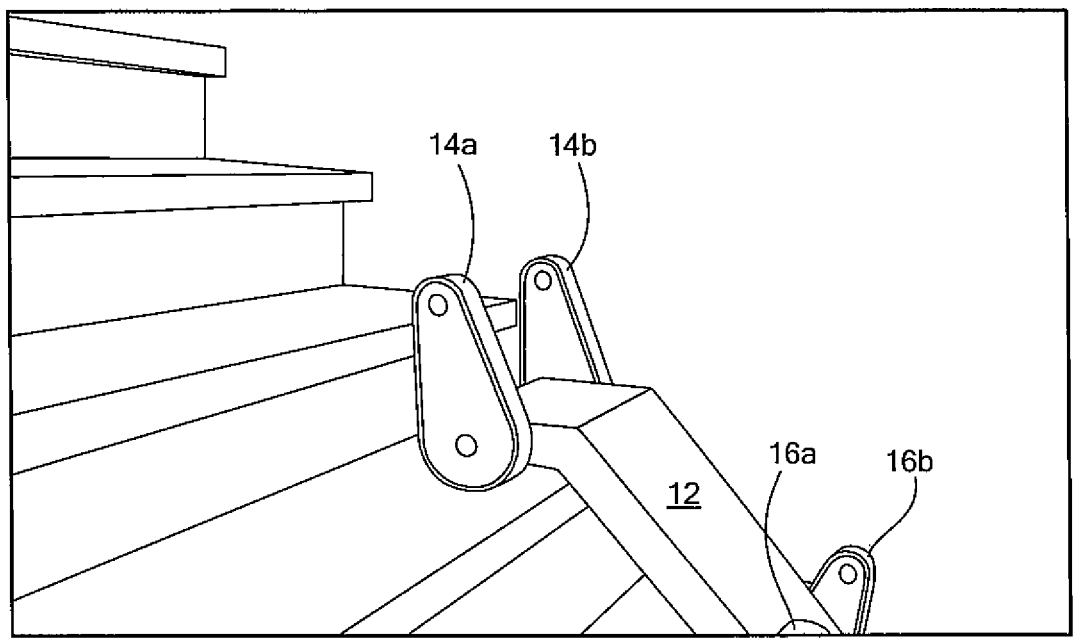
Figure 11D:
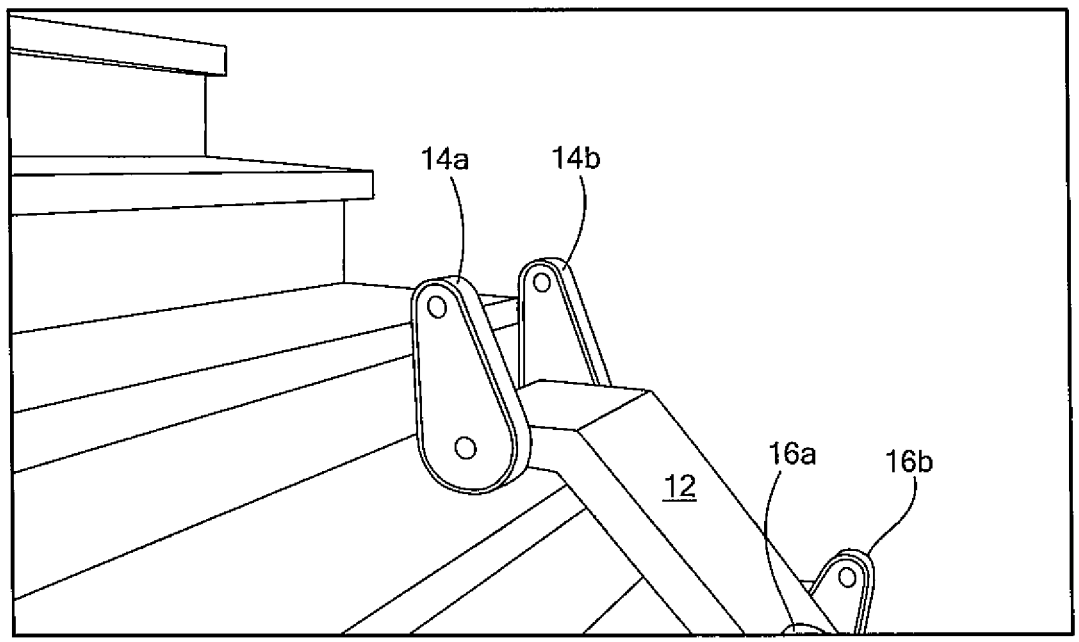
Figure 11E:
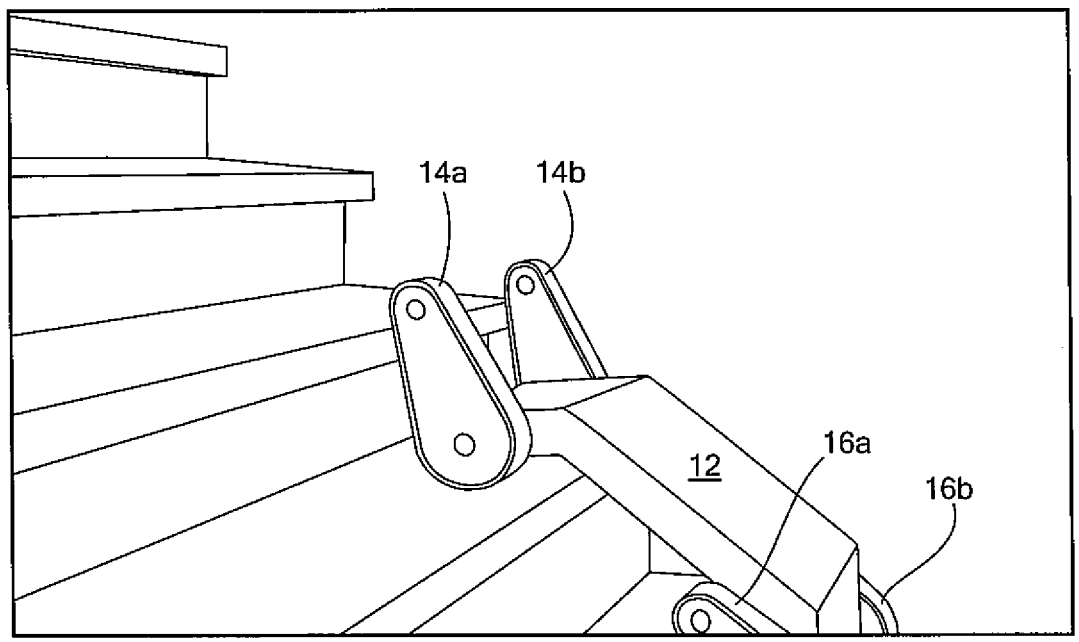
Figure 11F:
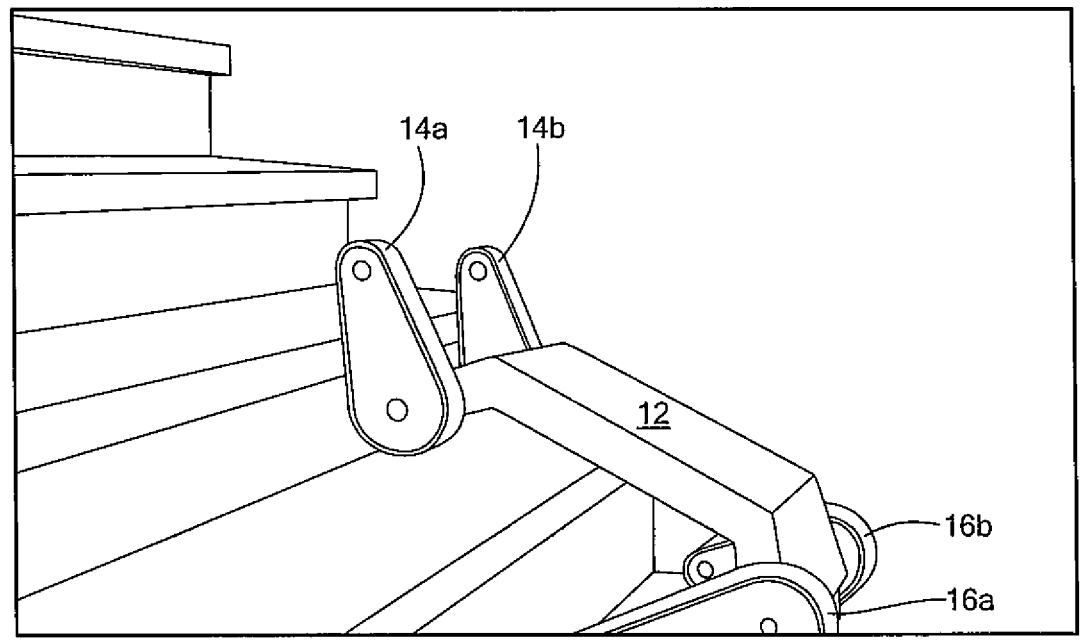
Figure 11G:
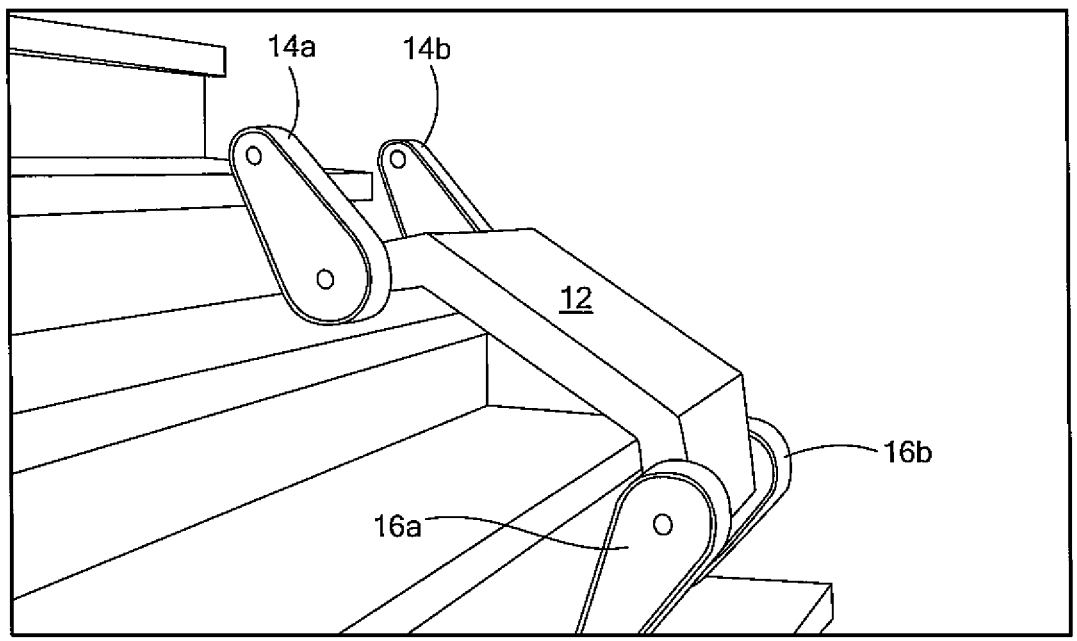
Figure 11H:
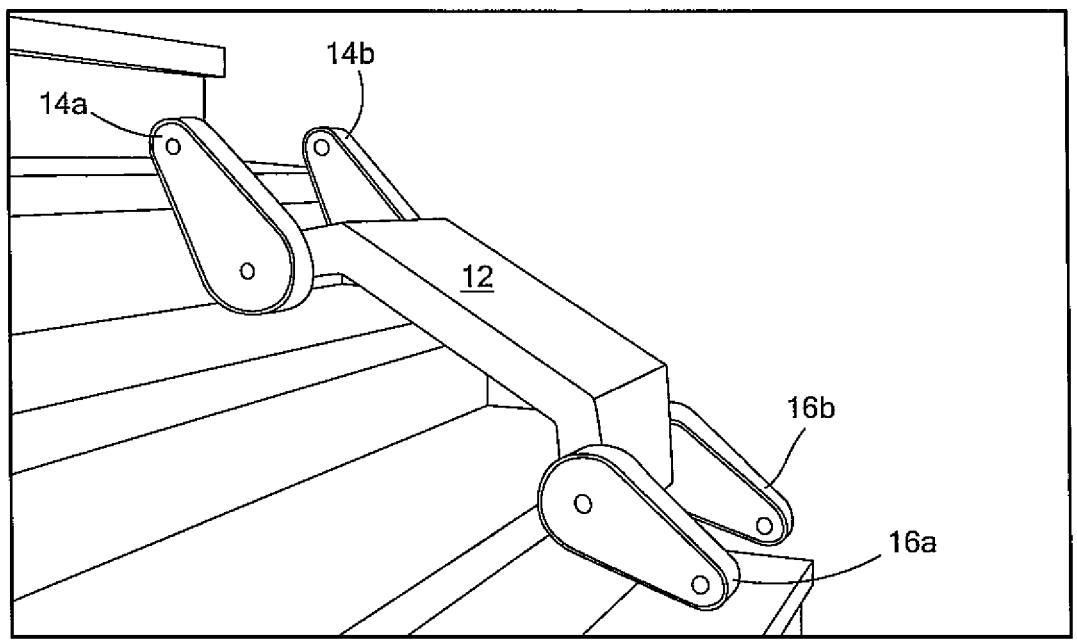
Figure 11I:
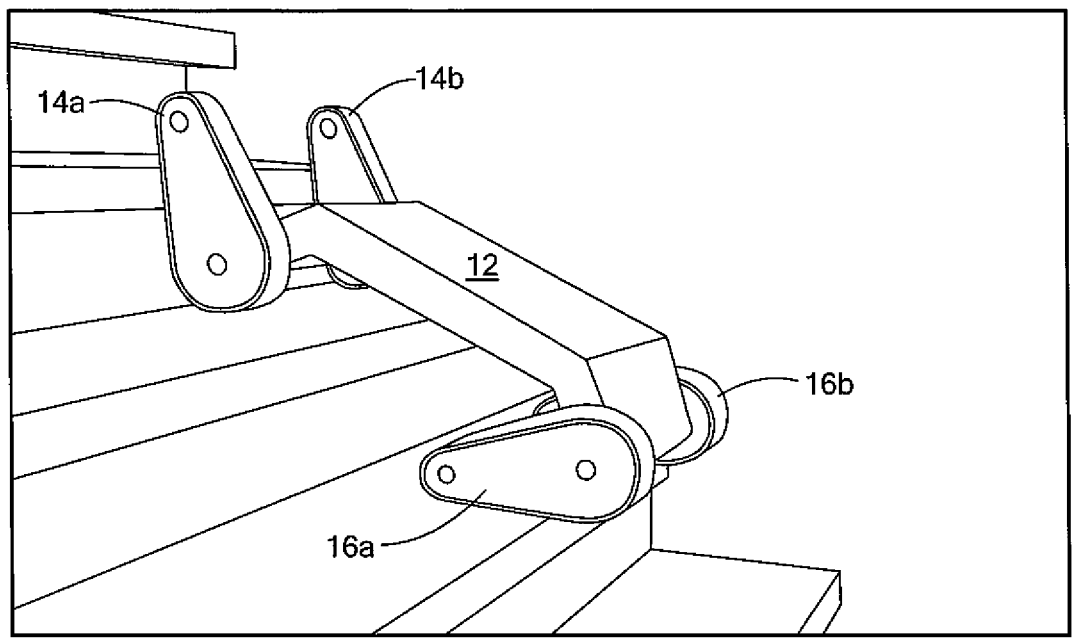
Figure 11J:
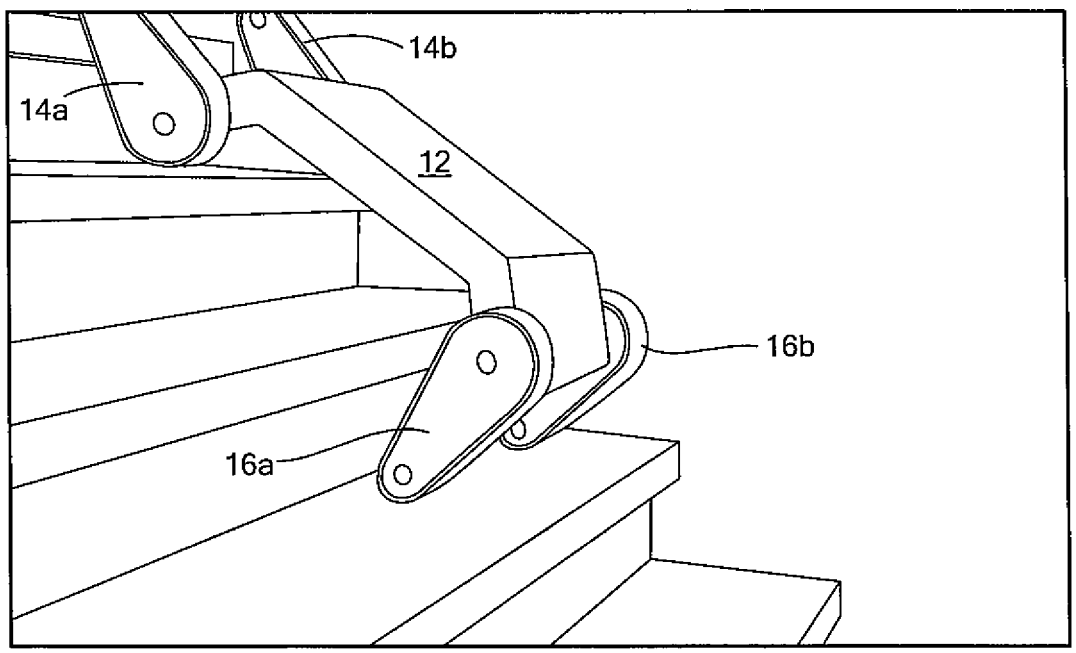

FIG. 8 shows a robot arm 30 with shoulder 160, elbow 162, wrist 164, and end effector 166. FIGS. 9-10 show a unique end effector 168 with compliant jaws 170a and 170b pivotably attached to yoke shaped wrist 164 via pins 172a and 172b. Tendon 174 connects on each end to jaw 170a and 170b and forms a loop terminating in pin socket 176 connected to a lead screw driven piston 178 in robot arm segment 180, FIG. 10. Driving the lead screw to the right in FIG. 10 opens jaws 170a and 170b and driving the lead screw to the left in FIG. 10 closes the jaws. The jaw tips 182a, 182b may form a digging hook as shown in FIG. 9.

Also shown in FIGS. 11A-11J, stair climbing may be accomplished by rotating forward flipper assemblies 14a, 14b, up and down (at least for the first stair tread) and continuously rotating the rear flippers 16a, 16b counter clockwise 360 degrees (see FIGS. 11C-11J). After the first stair tread has been traversed, the forward flipper assemblies may only rotate a few degrees clockwise and counter clockwise from vertical to clear the edge of subsequent stair treads or may not rotate at all and stay vertically oriented and the tracks need not be driven. In one embodiment, all the tracks are preferably driven at all times.

Figure 12A:
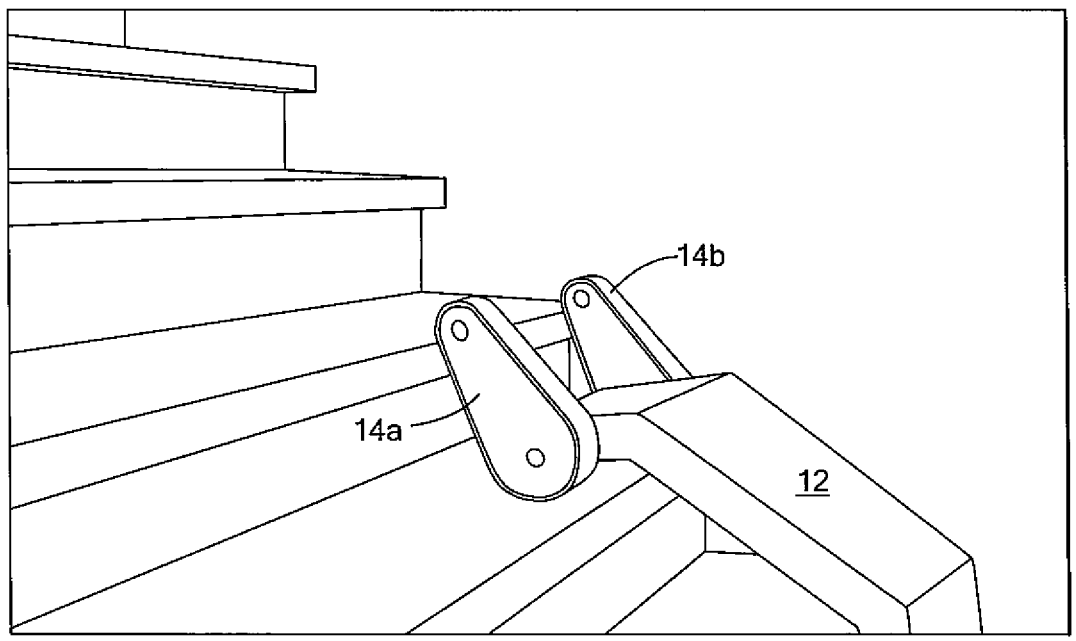
FIG. 12A-12C are schematic views showing another configuration of the deployed robot for stair climbing behaviors.
Figure 12B:
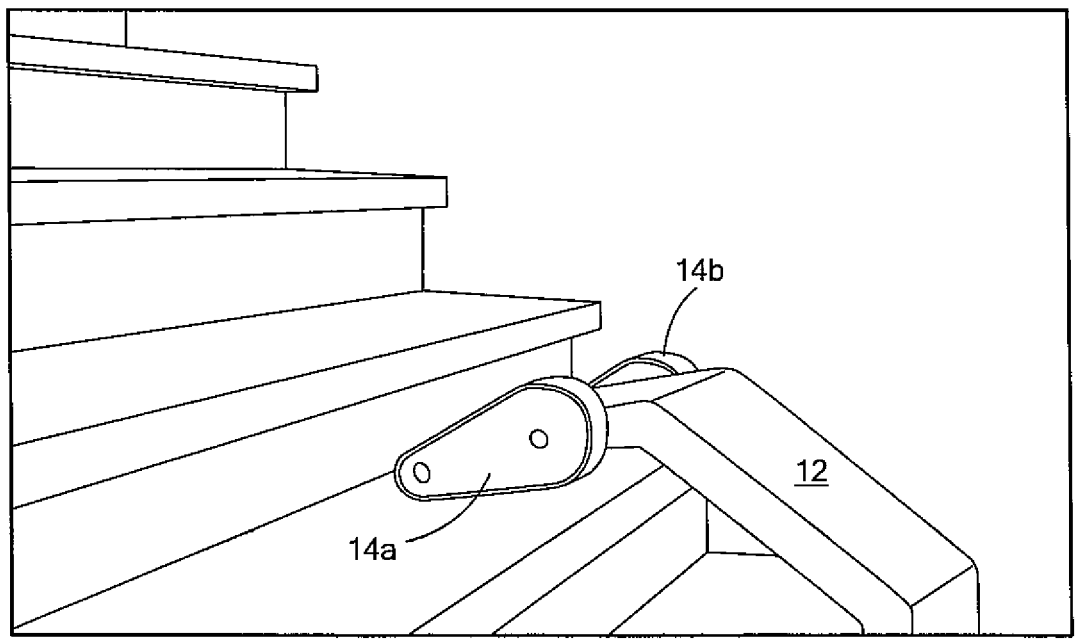
Figure 12C:
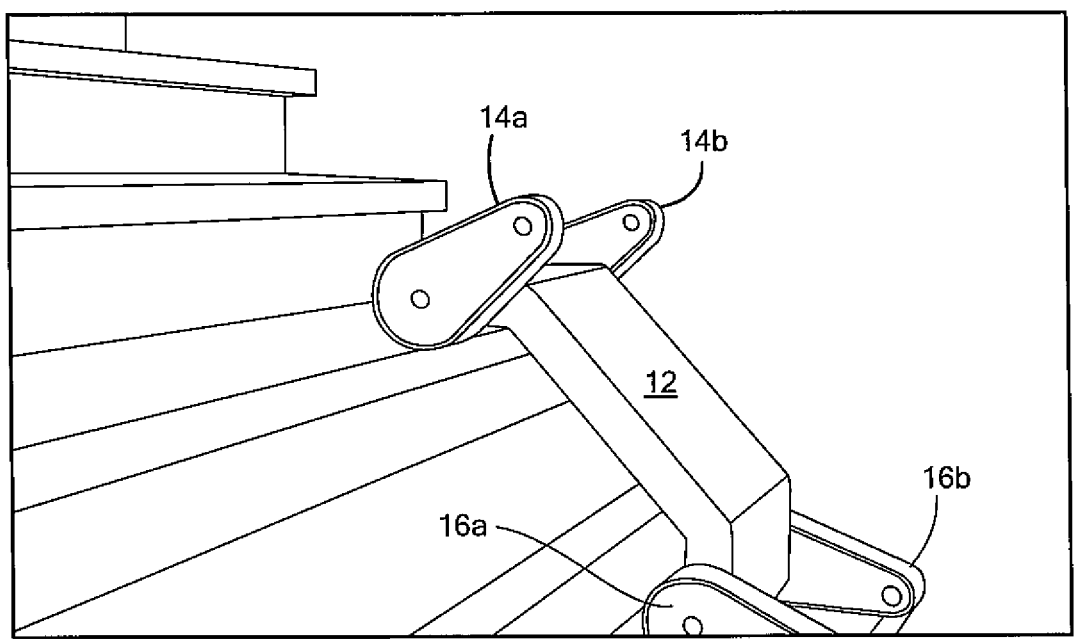

As shown in FIGS. 12A-12C, in another stair climbing modality, the forward flippers 14a, 14b may rotate counter clockwise 360 degrees and the rear flippers 16a, 16b may pivot slightly while the tracks are driven.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A compact ground robot comprising:
    a vehicle body;
    a forward pair of track assemblies mounted to the vehicle body;
    a rearward pair of track assemblies mounted to the vehicle body;
    the forward pair of track assemblies foldable underneath the vehicle body for transport of the robot;
    the rearward pair of track assemblies foldable underneath the vehicle body for transport of the robot;
    the forward pair of track assemblies unfoldable to a deployed position supporting the vehicle body for deployment of the robot; and
    the rearward pair of track assemblies unfoldable to a deployed position supporting the vehicle body for deployment of the robot.

2. The robot of claim 1 in which each track assembly includes a drive sprocket, a flipper, and a track about the sprocket and flipper.

3. The robot of claim 2 in which said flipper terminates in a pulley.

4. The robot of claim 2 in which said flipper is motorized for rotation.

5. The robot of claim 2 in which each track assembly sprocket and flipper rotate about a shaft connected to the vehicle body.

6. The robot of claim 5 in which each track assembly is connected to an arm, there is a bracket mounted to the vehicle body for each track assembly, and the arm is locked to the bracket for deployment and unlocked from the bracket for transport of the robot.

7. The robot of claim 6 in which the arm includes one or more pins and the bracket includes one or more slots receiving said pins therein.

8. The robot of claim 7 in which the forward track assembly arm includes a first pin receivable in a first slot in the bracket and a second pin received in a second slot in the bracket.

9. The robot of claim 7 in which the rearward track assembly arm includes a portion with first and second pins.

10. The robot of claim 9 in which the bracket for the rearward track assembly arm includes a first slot for the first pin and second slot for the second pin oriented 90° with respect to the first slot.

11. The robot of claim 6 in which the brackets are made of high-durometer elastomeric material.

12. The robot of claim 5 further including a first motor coupled to the shaft for rotating the sprocket and a second motor coupled to the shaft for rotating the flipper.

13. The robot of claim 12 further including one or more gears between the sprocket and the first motor and one or more gears between the flipper and the second motor.

14. The robot of claim 12 in which the drive sprocket includes a housing rotatable with respect to the shaft and enclosing the first and second motors therein.

15. The robot of claim 14 in which the flipper is coupled to a flipper drive gear in the sprocket housing rotatable about the shaft and rotatable with respect to the housing.

16. The robot of claim 1 further including a robot arm mounted to the vehicle body.

17. The robot of claim 16 further including an end effector for the robot arm.

18. The robot of claim 17 in which the end effector includes compliant first and second pivoting jaws and a driven tendon connected to the jaws.

19. The robot of claim 18 further including a linear actuator driving the tendon to open and close the jaws.

20. A compact ground robot comprising:
a vehicle body including a forward pair of brackets and a rearward pair of brackets;
a forward pair of track assemblies each including an arm lockable with respect to the forward bracket to deploy the forward pair of track assemblies and the arm rotatable with respect to the forward bracket to fold the forward track assemblies underneath the vehicle body; and
a rearward pair of track assemblies each including an arm lockable with respect to the rearward bracket to deploy the rearward pair of track assemblies and each arm rotatable with respect to a rearward bracket to fold the rearward track assemblies underneath the vehicle body.

21. The robot of claim 20 in which each track assembly includes a drive sprocket, a motorized flipper, and a track about the sprocket and motorized flipper.

22. The robot of claim 21 in which each track assembly sprocket and flipper rotate about a shaft connected to the vehicle body via a said arm.

23. The robot of claim 22 in which each track assembly further including a first motor coupled to the shaft for rotating the sprocket and a second motor coupled to the shaft for rotating the flipper.

24. A compact ground robot comprising:
a vehicle body including a forward pair of brackets and a rearward pair of brackets;
a forward pair of track assemblies each including a track driven by a sprocket rotatable about a shaft coupled to a front arm lockable into the forward bracket to deploy the forward pair of track assemblies and said arm rotatable with respect to the forward bracket to fold the forward track assemblies underneath the vehicle body;
a rearward pair of track assemblies each including a track driven by a sprocket rotatable about a shaft coupled to a rear arm lockable with respect to the rearward bracket to deploy the rearward pair of track assemblies and said arm rotatable with respect to the rearward bracket to fold the rearward track assemblies underneath the vehicle body.

25. The robot of claim 24 in which each track assembly further includes a flipper.

26. The robot of claim 24 in which the forward track assembly front arm includes a first pin receivable in a first slot in the bracket and a second pin receivable in a second slot in the bracket.

27. The robot of claim 24 in which the rearward track assembly rear arm includes a portion with first and second pins.

28. The robot of claim 27 in which the rearward bracket for the rearward track assembly rear arm includes a first slot for the first pin and second slot for the second pin oriented 90° with respect to the first slot.

29. A compact ground robot comprising:
a vehicle body;
a forward pair of track assembles mounted to the vehicle body;
a rearward pair of track assemblies mounted to the vehicle body;
each track assembly including a drive sprocket, a flipper, and a track about the sprocket and flipper;
the drive sprocket and flipper rotatable about a shaft connected to the vehicle body;
a first motor coupled to the shaft for rotating the drive sprocket and a second motor coupled to the shaft for rotating the flipper;
the drive sprocket housing the first and second motors therein; and
the vehicle body including brackets for the track assemblies and the track assemblies each is an arm coupled to the track assembly shaft, the arms and the brackets configured to deploy the track assemblies and to fold them underneath the vehicle body.

30. The robot of claim 29 further including one or more gears between the sprocket and the first motor and one or more gears between the flipper and the second motor.

31. The robot of claim 30 in which the flipper is coupled to a flipper drive gear in the drive sprocket and rotatable about the shaft and rotatable with respect to the drive sprocket.

32. A compact ground robot comprising:
a vehicle body;
a forward pair of track assemblies mounted to the vehicle body;
a rearward pair of track assemblies mounted to the vehicle body;
each track assembly including a drive sprocket, a flipper, and a track about the sprocket and flipper;
the drive sprocket and flipper rotatable about a shaft connected to the vehicle body;
a first motor coupled to the shaft for rotating the drive sprocket and a second motor coupled to the shaft for rotating the flipper;
the drive sprocket housing the first and second motors therein;
one or more gears between the sprocket and the first motor and a flipper drive gear between the flipper and the second motor; and
the flipper is coupled to the flipper drive gear and rotatable about the shaft and rotatable with respect to the drive sprocket.

\* \* \* \* \*